(12) United States Patent
Badding et al.

(10) Patent No.: US 11,271,201 B2
(45) Date of Patent: Mar. 8, 2022

(54) ENERGY DEVICE WITH LITHIUM

(71) Applicant: CORNING INCORPORATED, Corning, NY (US)

(72) Inventors: Michael Edward Badding, Campbell, NY (US); Ryan David Bayliss, Corning, NY (US); Jennifer Anella Heine, Hammondsport, NY (US); Cameron Wayne Tanner, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 273 days.

(21) Appl. No.: 16/521,020

(22) Filed: Jul. 24, 2019

(65) Prior Publication Data

US 2021/0020932 A1    Jan. 21, 2021

Related U.S. Application Data

(60) Provisional application No. 62/874,165, filed on Jul. 15, 2019.

(51) Int. Cl.
*H01M 4/525*    (2010.01)
*H01M 10/0562*    (2010.01)
(Continued)

(52) U.S. Cl.
CPC ............ *H01M 4/525* (2013.01); *C01G 51/42* (2013.01); *H01M 4/131* (2013.01);
(Continued)

(58) Field of Classification Search
CPC .... H01M 4/131; H01M 4/1319; H01M 4/525; H01M 10/0525; H01M 10/0562; C01G 51/42
See application file for complete search history.

(56) References Cited

U.S. PATENT DOCUMENTS 5,089,455 A    2/1992  Ketcham et al.
5,561,004 A    10/1996  Bates et al.
(Continued)

FOREIGN PATENT DOCUMENTS

JP    2010-272425 A    12/2010
WO    2017/106817 A1    6/2017
(Continued)

OTHER PUBLICATIONS

Arora et al; "Capacity Fade Mechanisms and Side Reactions in Lithium-Ion Batteries" ; J. Electrochem. Soc., vol. 145, No. 10; 1998; pp. 3647-3667.
(Continued)

*Primary Examiner* — Stephen J Yanchuk
(74) *Attorney, Agent, or Firm* — Russell S. Magaziner

(57) ABSTRACT

An energy device has an electrode including lithium cobaltite (LCO) grains, where the LCO grains are sintered to one another forming a self-supporting sheet with porous passages. The porous passages wind and branch through the sheet. The energy device further includes a solid electrolyte comprising lithium phosphosulfide (LPS) overlaying a major surface of the sheet and extending into the porous passages. The sheet serves as mechanical support for the solid electrolyte, allowing for high temperature joining of the LPS to the LCO without binder in the LPS.

25 Claims, 13 Drawing Sheets

(51) Int. Cl.
H01M 4/1391 (2010.01)
C01G 51/00 (2006.01)
H01M 4/131 (2010.01)
H01M 10/0525 (2010.01)

(52) U.S. Cl.
CPC ..... *H01M 4/1391* (2013.01); *H01M 10/0525* (2013.01); *H01M 10/0562* (2013.01)

(56) References Cited

U.S. PATENT DOCUMENTS

| | | | |
|---|---|---|---|
| 10,700,378 | B2 | 6/2020 | Sakamoto et al. |
| 10,892,486 | B2 | 1/2021 | Yushin et al. |
| 2009/0246636 | A1 | 10/2009 | Chiang et al. |
| 2011/0003211 | A1 | 1/2011 | Hudson et al. |
| 2015/0099188 | A1 | 4/2015 | Holme et al. |
| 2016/0336617 | A1* | 11/2016 | Yamazaki ........... H01M 10/052 |
| 2017/0173893 | A1* | 6/2017 | Li ........................ H01M 4/623 |
| 2017/0210634 | A1 | 7/2017 | Badding et al. |
| 2018/0114977 | A1 | 4/2018 | Sakamoto et al. |
| 2018/0277889 | A1* | 9/2018 | Anandan ............ H01M 10/052 |
| 2019/0207252 | A1 | 7/2019 | Badding et al. |
| 2019/0260066 | A1* | 8/2019 | Hu .................... H01M 10/0569 |
| 2019/0363357 | A1 | 11/2019 | Yura et al. |
| 2020/0175539 | A1* | 6/2020 | Hudson .............. G06Q 30/0222 |
| 2020/0243842 | A1* | 7/2020 | Aronov .................. H01M 4/38 |
| 2020/0358086 | A1* | 11/2020 | Hu ........................ H01M 10/18 |

FOREIGN PATENT DOCUMENTS

| | | |
|---|---|---|
| WO | 2018025594 A1 | 2/2018 |
| WO | 2018/147387 A1 | 8/2018 |
| WO | 2018/155155 A1 | 8/2018 |

OTHER PUBLICATIONS

Bandhauer et al; "A Critical Review of Thermal Issues in Lithium-Ion Batteries" ; Jounral of the Electrochemical Society, 158 (3); R1-R25 (2011.
Bates et al; "Electrical Properties of Amorphous Lithium Electrolyte Thin Films" ; Solid State Ionics 53-56 (1992) pp. 647-654.
Bates et al; "Thin-Film Rechargeable Lithium Battery," Journal of Power Sources, 54 (1995) pp. 58-62.
Davidson et al; "Low Cost, Novel Methods for Fabricating All-Solid-State Lithium Ion Batteries," Bachelor's Project at Worchester Polytechnic Institute, Apr. 23, 2013, 126 Pages.
Dudney; "Thin Film Micro-Batteries" ; the Electrochemical Society Interface, 2008 pp. 44-48.
Howell et al; "Overview of the DOE VTO Advanced Battery R&D Program" ; US Department of Energy; (2016) 24 Pages.
Jonson et al; "Tape Casting and Sintering of Li7La3Zr1.75Nb0.25Al0.1O12 With Li3BO3 Additions" ; Solid State Ionics, 323 (2018) pp. 49-55.
Lai et la; "Ultrahigh-Energy-Density Microbatteries Enabled by New Electrode Architecture and Micropackaging Design," 22 (2010) E139-144.
Larsson et al; "Toxic Fluoride Gas Emissions From Lithium-Ion Battery Fires" ; Nature, Scientific Reports; 7:10018; 13 Pages (2017.
Lee et al; "A Simple Wireless Power Charging Antenna System: Evaluation of Ferrite Sheet" ; IEEE Transactions on Magnetics, vol. 53, No. 7, (2017) 5 Pages.
Liu et al; "Long Cycle Life Lithium Ion Battery With Lithium Nickel Cobalt Manganese Oxide (NCM) Cathode" ; Journal of Power Sources, 261 (2014) pp. 285-291.
Matsuda et al; "Thin-Film Lithium Batteries With 0.3-30m Thick LiCoO2 Films Fabricated by High-Rate Pulsed Laser Deposition" ; Solid State Ionics, 320 (2018) pp. 38-44.
Munoz et al; "Increased Electrical Conductivity of LiPON Glasses Produced by Ammonolysis" ; Solid State Ionics, 179 (2008) pp. 574-579.
Senevirathne et al; "A New Crystalline Upon Electrolyte: Synthesis, Properties, and Electronic Structure" ; Solid State Ionics, 233 (2013) pp. 95-101.
Wu et al; "Potassium-Sodium Niobate Lead-Free Piezoelectric Materials: Past, Present, and Future of Phase Boundaries," Chem. Rev., 117 (2015) 2559-2595.
Yi et al; "Flame Made Nanoparticles Permit Processing of Dense, Flexible, Li+ Conducting Ceramic Electrolyte Thin Films of Cubic-Li7La3Zr2O12 (c-LLZO)," J. Mater. Chem. A., 4 (2016) 12947-12954.
Yi et al; "Key Parameters Governing the Densification of Cubic-Li7La3Zr2O12Li+ Conductors" ; Journal of Power Sources, 352, (2017) pp. 156-164.
Enery Education: Definition of Cross Sectional Area. 1 page. Webpage. 2016. Best Available Copy.
English translation of WO-2018025594-A1 (Year: 2018).
International Search Report and Written Opinion of the International Searching Authority; PCT/US2020/016484; dated Jun. 4, 2020; 11 Pages; European Patent Office.

* cited by examiner

FIG. 6A
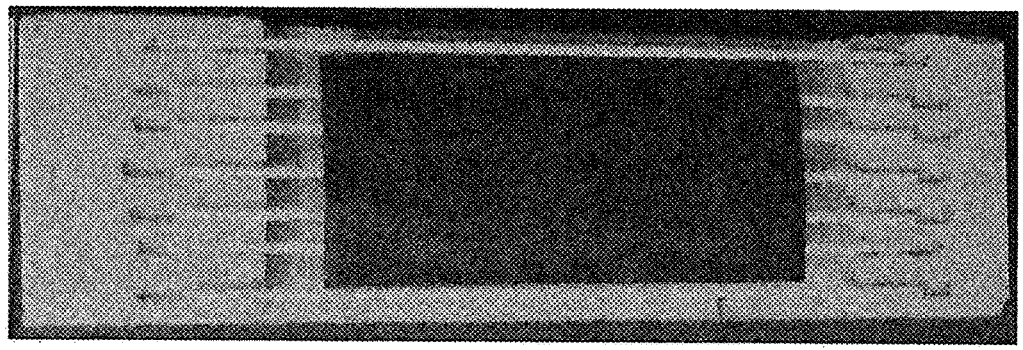
(a)
(b)
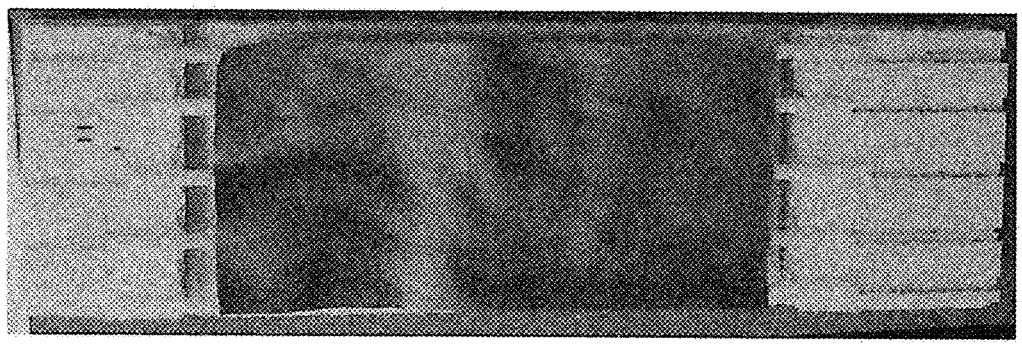
FIG. 6B
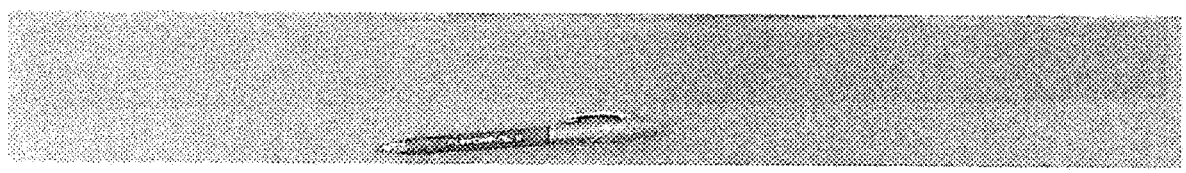
FIG. 7

ENERGY DEVICE WITH LITHIUM

BACKGROUND

This application claims the benefit of priority of U.S. Provisional Application Ser. No. 62/874,165 filed on Jul. 15, 2019 the contents of which are relied upon and incorporated herein by reference in their entirety as if fully set forth below.

BACKGROUND

The disclosure relates generally to an electrode for a battery and to a method of preparing same. Various types of battery chemistries exist. Lithium-ion batteries are currently a popular chemistry for a variety of applications. For example, lithium-ion battery technology that is based upon liquid carbonate electrolytes and intercalation electrodes are used in a variety of small electronic devices, such as cellular telephones, laptop computers, and cordless power tools, and also in larger applications, such as hybrid and all electric vehicles and to stabilize electric grids at local and national levels under periods of high demand. Despite the wide-ranging adoption and use of lithium-ion batteries, demand still exists for batteries with higher energy density, smaller size, lighter weight, and lower cost.

Moreover, irreversible reactions often facilitated by the liquid electrolyte lead to fade in capacity. Further, the range of temperatures for operation and charging of lithium batteries with liquid electrolyte is restricted. Overheating is damaging to cell lifetime, and to guard against overheating, lithium-ion batteries employ protection circuits to reduce current draw or charging rate. Temperature is actively managed in applications like electric vehicles where the batteries are densely packed in order to minimize volume.

Still further, the ability to charge quickly is valued in consumer electronics, and many recently manufactured devices can be charged to 80% of capacity is less than hour, albeit with potential loss of battery life. The expectation of quick charging is even more pressing for electric vehicles. Even though a typical charging time is around 45 minutes, the expectation is that the battery of an electric vehicle can be charged to full in a time comparable to refueling of a gasoline powered vehicle of around 5 minutes.

SUMMARY

In one aspect, embodiments of the disclosure relate to an energy device that includes an electrode comprising lithium cobaltite ("LCO"; $LiCoO_2$, $Li_xCoO_2$ with $0<x<1$) grains, where the LCO grains are sintered to one another forming a self-supporting sheet with porous passages and where the porous passages wind and branch through the sheet. The energy device further includes a solid electrolyte comprising lithium phosphosulfide ("LPS"; e.g., $75Li_2S \cdot 25P_2S_5$ and $Li_7P_3S_{11}$) overlaying a first major surface of the sheet and extending into the porous passages. Such a device may provide higher energy density, smaller size, lighter weight, and lower cost when compared to other devices.

According to an exemplary embodiment, the LPS is sintered or fused to form a continuous layer, as opposed to individual particles of LPS adhered together with a binder. Aspects of the present technology allow for the LPS to be binder-free, increasing the volumetric concentration of LPS in the energy device. According to an exemplary embodiment, the LPS overlaying the first major surface has a density of at least 90% and the solid electrolyte mostly consists of the LPS by volume (e.g., >70%, >90%, >95%, substantially consists of).

According to an exemplary embodiment, at least some of the porous passages have a length of at least 10 μm (e.g., at least 20 μm, at least 40 μm). In some such embodiments, the LPS extends into at least some of the porous passages a distance of at least 3 μm (e.g., at least 10 μm, at least 20 μm, at least 40 μm) inward from the first major surface. In some embodiments, the LPS is also overlaying a second major surface the sheet of LCO. For example, LPS may even extend through the porous passages and connect the LPS overlaying the first and second surfaces. Infusion in and through the electrode may increase performance of the energy device compared to devices with flat, planar interfaces, such as due to increased surface area of the interface at the micro-scale.

According to an exemplary embodiment, the sheet of LCO has a thickness no greater than 300 μm and the LPS extends outward from the first major surface by at least 1 μm and/or at most 100 μm. In some such embodiments, the sheet of LCO is thin, such as less than 100 μm, or even less than 50 μm.

In another aspect, embodiments of the disclosure relate to an energy device that includes an electrode comprising lithium cobaltite (LCO) grains, where the LCO grains are sintered to one another forming a sheet; and the energy device further includes a solid electrolyte comprising lithium phosphosulfide (LPS) overlaying a first major surface of the sheet. According to this aspect, the sheet of LCO serves as mechanical support for the solid electrolyte. A separate substrate is unnecessary and the resulting energy device may be higher energy density, smaller size, lighter weight, and lower cost when compared to other devices. As a result of the LCO serving as mechanical support, a footprint, of the solid electrolyte, facing the sheet of LCO is not greater than 120% of a footprint of the first major surface.

In yet another aspect, embodiments of the disclosure relate to a method of manufacturing an energy device. The method includes steps of joining hot lithium phosphosulfide (LPS) to a porous, self-supporting sheet of lithium cobaltite (LCO), the LPS having a temperature above 500° C., wherein the hot LPS is in a fluid state; infusing the hot LPS into porous passages of the sheet; and cooling the LPS such that the LPS solidifies and solid LPS extends into the passages. In some embodiments, prior to the step of joining hot LPS, the sheet of LCO is self-supporting such that the sheet may be held vertically to a height of 2 meters without falling apart under its own weight, such as where the sheet of LCO has a length of at least 2 m. In some embodiments, prior to the step of joining hot LPS, the method further comprises melting the LPS while the LPS is overlaying and contacting the sheet of LCO. Prior to the step of melting, the method may further comprise drawing the sheet of LCO through a sol-gel comprising the LPS at a rate to deposit a layer of LPS on the sheet of LCO that then has a thickness of at least 1 μm and no more than 100 μm after the step of cooling the LPS. This manufacturing process differs from processes that use LPS in a binder and press the LPS to LCO, and may provide higher energy density, smaller size, lighter weight, and lower cost at least because the LPS may be binder-free and may be infused throughout the LCO.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments.

FIGS. 6A and 6B depict an image of LCO tape rapidly debound and sintered with a soak temperature of 1100° C. for a time of 20 min and an image of LCO tape rapidly debound and sintered with a soak temperature of 1100° C. for a time of 1.25 min, respectively.

FIG. 7 depicts an exemplary embodiment of a continuously and rapidly sintered tape.

DETAILED DESCRIPTION

Figure 1:
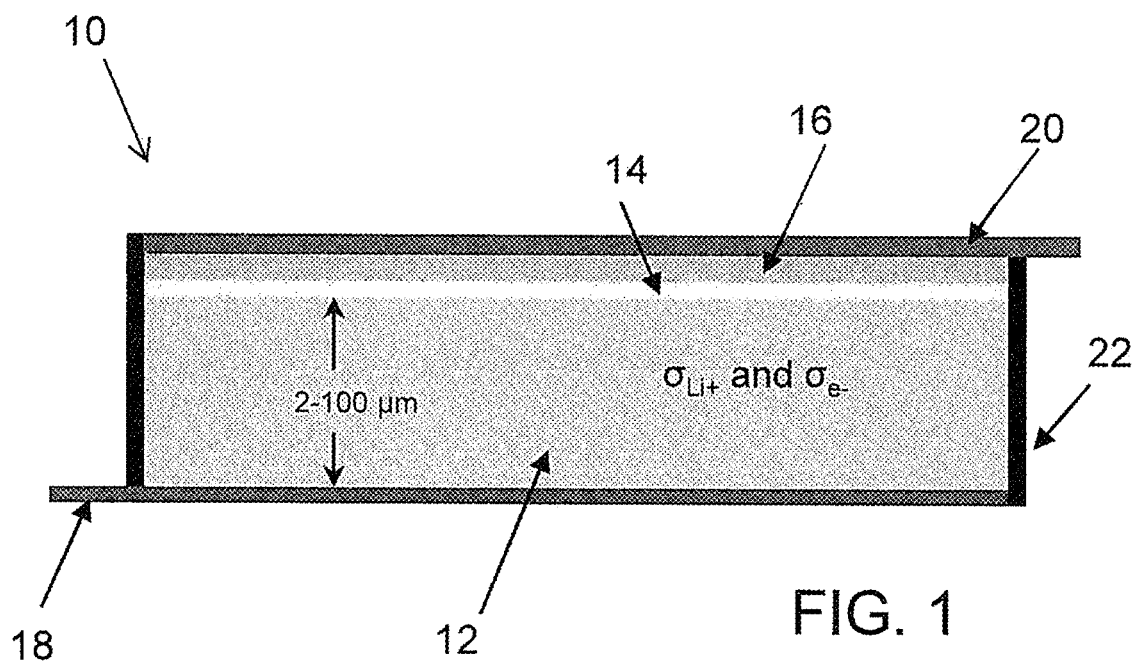
FIG. 1 is a schematic, cross-sectional view depicting a lithium-ion battery having a sintered cathode, according to an exemplary embodiment.

Referring generally to the figures, various embodiments of a sintered electrode that includes a chalcogenide or fluoride and at least one alkali metal or alkaline earth metal are disclosed. The sintered electrode has a thickness of 5 μm to 100 μm and a cross-sectional area of at least 3 cm$^2$. Compared to conventional electrode materials, the sintered electrode can be made much larger and self-supporting than typical thin-film formed electrodes and is usable without any additional finishing techniques, such as grinding or polishing, in contrast to other sintered electrodes. The disclosed sintered electrodes are able to achieve these advantages through a tape manufacturing process that allows for must faster manufacturing speeds of "medium" thickness electrode materials in which processing speed is independent of electrode thickness. That is, the electrodes can be made thicker than conventional electrodes made through thin film techniques and thinner than other sintered electrodes that have to be ground down to usable sizes. Moreover, the electrode can be rapidly sintered in a more economical process than is currently used for manufacturing electrode materials. Indeed, conventional processes typically utilize thin film techniques that are much slower and more difficult to build up thick layers. In this way, the relatively thicker sintered electrodes of the present disclose not only eliminate inactive components, such as mechanical supports, but also increase the charge capacity of the battery. Moreover, the thickness of the electrode and tape-casting manufacturing process allow for electrode materials to be manufactured in a roll-to-roll format.

The sintered electrodes disclosed herein are envisioned to be suitable for a variety of battery chemistries, including lithium-ion, sodium-ion, and magnesium-ion batteries as well those using solid state or liquid electrolyte. Various embodiments of the sintered electrode, manufacturing process, and lithium-ion batteries are disclosed herein. Such embodiments are provided by way of example and not by way of limitation.

As mentioned, various embodiments of a sintered electrode composed of chalcogenide compound including at least one of an alkali metal or alkaline earth metal. As used herein, a chalcogenide compound refers to an oxide, sulfide, or selenide compound. In other embodiments, the sintered electrode may be a fluoride compound. In embodiments, the chalcogenide includes at least one of lithium, sodium, or magnesium. In embodiments, the chalcogenide also includes at least one transition metal, such as cobalt, manganese, nickel, niobium, tantalum, vanadium, titanium, copper, chromium, tungsten, molybdenum, tin, germanium, antimony, bismuth, or iron.

Exemplary embodiments of a lithium chalcogenide include lithium cobaltite (LCO), lithium manganite spinel (LMO), lithium nickel cobalt aluminate (NCA), lithium iron phosphate (LFP), lithium cobalt phosphate (LCP), lithium titanate, lithium niobium tungstate, lithium nickel manganate, and lithium titanium sulfide ($LiTiS_2$), among others. Exemplary embodiments of a sodium chalcogenide include $NaVPO_4F$, $NaMnO_2$, $Na_{2/3}Mn_{1-y}Mg_yO_2$ (0<y<1), $Na_2Li_2Ti_5O_{12}$, or $Na_2Ti_3O_7$, among others. Exemplary embodiments of a magnesium chalcogenide include magnesiochromite ($MgCr_2O_4$) and $MgMn_2O_4$, among others.

In embodiments, the chalcogenide (or fluoride) is a first phase of the sintered electrode, and the sintered electrode contains at least one other phase (e.g., a second phase, a third phase, a fourth phase, etc.). In embodiments, the additional phase or phases are selected to provide additional functionality. For example, in an embodiment involving a lithium electrode, a second phase enhances the effective lithium conductivity of the electrode, for example a lithium garnet phase. In an embodiment, the second phase enhances electronic conductivity. The additional phase or phases can be added prior to sintering, or the sintered electrode may contain open porosity that may be infiltrated with the additional phase or phases. In embodiments, the second phase is a spinel that provides additional electronic conductivity.

One advantage of the sintered electrodes disclosed herein is that they can be made larger than conventional electrode materials for batteries, such as those made using thin-film techniques. In embodiments, the sintered electrode has a thickness of from 5 μm to 100 μm. In further embodiments, the sintered electrode has a thickness of from 20 μm to 80 μm, and in still other embodiments, the sintered electrode has a thickness of from 30 μm to 60 μm. Besides being thicker than thin-film electrodes, the sintered electrode can also be made with a relatively larger cross-sectional area. In embodiments, the sintered electrode has a cross-sectional area of at least 3 $cm^2$. In further embodiments, the sintered electrode has a cross-sectional area of at least 10 $cm^2$, and in still other embodiments, the sintered electrode has a cross-sectional area of at least 100 $cm^2$. In embodiments, the sintered electrode has a cross-sectional area of up to 1 $m^2$.

The sintered electrode is able to be made larger than conventional thin-film electrodes because the electrode is formed from a tape cast or extruded green tape that is rapidly sintered. In order to form the green tape, a slurry (or paste) is prepared from a powder component, a binder, and a solvent. The powder component includes a powdered compound or powdered compounds containing a chalcogenide and at least one alkali metal or alkaline earth metal. The powdered compounds containing the chalcogenide and the alkali metal or alkaline earth metal may be a single powdered compound. Alternatively or additionally, the compounds can include chalcogenide compound and a compound containing an alkali metal or alkaline earth metal. Further, in embodiments, the powdered compound can further contain a transition metal along with or in a separate compound from the chalcogenide compound and the compound containing an alkali metal or alkaline earth metal.

For example, with respect to a lithium electrode, the powdered compound can be a chalcogenide compound containing lithium and a transition metal, such as LCO or LMO. In another example, one compound can contain the chalcogenide and the compound containing an alkali metal or alkaline earth metal, and another compound can contain a transition metal. For example, with respect to a lithium electrode, the chalcogenide compound can be at least one of $Li_2O$, $Li_2CO_3$, LiOH, $LiNO_3$, lithium acetate ($CH_3COOLi$), or lithium citrate ($Li_3C_6H_5O_7$), among others, and the transition metal-containing compound can be at least one of $MnO_2$, $Mn_2O_3$, $Co_2O_3$, CoO, NiO, $Ni_2O_3$, $Fe_2O_3$, $Fe_3O_4$, FeO, $TiO_2$, $Nb_2O_5$, $V_2O_5$, $VO_2$, $Ta_2O_5$, or $WO_3$. In embodiments, the powder component of the slurry or paste (including all powdered compounds) comprises from 40% to 75% by weight of the slurry (or paste). In other embodiments, the powder component comprises from 45% to 60% by weight of the slurry (or paste), and in still other embodiments, the powder component comprises from 50% to 55% by weight of the slurry (or paste).

The slurry (or paste) is provided with a binder that holds the powder component together in the form of the green tape prior to sintering. In embodiments, the binder is at least one of polyvinyl butyral (PVB) (e.g., Butvar® PVB resins, available from Eastman Chemical Company), acrylic polymers (e.g., Elvacite® acrylic resins, available from Lucite International), or polyvinyl alcohol, among others.

The slurry (or paste) is also provided with a solvent in which the powder component and binder are dispersed. In particular, the solvent is selected so as to avoid leaching the alkali metal or alkali earth metal from the chalcogenide compounds in the slurry. Table 2, below, demonstrates leaching characteristics for two solvents with respect to lithium ions, non-polar 1-methoxy-2-propanyl acetate (MPA) and a polar ethanol-butanol mixture. In investigating the leaching characteristics of the two solvents, 200 g of the powdered electrode material identified in Table 2 were mixed with the 200 g of the solvent. The mixture was centrifuged, and the decanted liquid was analyzed for its lithium concentration via induction coupled plasma (ICP) spectroscopy. As shown in Table 2, the polar ethanol-butanol mixture contained a much greater concentration of lithium than the non-polar MPA. Such leaching of the lithium from the ceramics (e.g., LCO, LMO, etc.) can occur as the result of ion exchange or the formation of hydroxides. Once the lithium enters the solvent, there can be several unwanted side-effects. For example, the solubility of the binder may be reduced. Further, the dissolved lithium may interfere with dispersants. Still further, the dissolved lithium may migrate during drying, which may lead to chemical inhomogeneity in the dried tape. Additionally, the chemistry of the inorganic particles themselves is altered. Moreover, reaction with the solvent is time dependent so the slip properties are subject to continuous change and a potentially unstable process.

TABLE 1

Leaching of lithium from electrode material in non-polar and polar solvents.

| electrode Material | Solvent | Li Concentration ($\times 10^{-6}$ mg/L) |
|---|---|---|
| LMO | MPA | <0.005 |
| LMO | MPA | <0.005 |
| LMO | Ethanol-Butanol Mixture | 1.61 |
| LMO | Ethanol-Butanol Mixture | 1.77 |
| LCO | MPA | <0.005 |
| LCO | MPA | <0.005 |
| LCO | Ethanol-Butanol Mixture | 2.05 |
| LCO | Ethanol-Butanol Mixture | 2.28 |

Accordingly, in embodiments, the solvent is selected to be non-polar. In particular embodiments, the non-polar solvent has a dielectric constant at 20° C. of less than 20. In other embodiments, the non-polar solvent has as dielectric constant at 20° C. of less than 10, and in still other embodiments, the non-polar solvent has a dielectric constant at 20° C. of less than 5. Further, in embodiments, the solvent leaches less than 1 ng/L of the alkali metal or alkaline earth metal from the powder component in the slurry. In other embodiments, the solvent leaches less than 0.1 ng/L of the alkali metal or alkaline earth metal from the powder component in the slurry, and in still other embodiments, the solvent leaches less than 0.01 ng/L of the alkali metal or alkaline earth metal from the powder component in the slurry.

In embodiments, the chemistry of the binder may be adjusted to work with non-polar solvents, such as MPA. For example, Butvar® B-79 is a commercially available PVB that has a low concentration of hydroxyl groups from polyvinyl alcohol (11-13% by weight) and, compared to other PVB binders, has a low molecular weight. This allows for ease of dissolution and high solubility to control viscosity and enable a high loading of solids.

In embodiments, that slurry (or paste) may contain other additives that aid in processing. For example, in embodiments, the slurry (or paste) may contain between 0.1% to 5% by weight of a dispersant and/or of a plasticizer. An exemplary dispersant is fish-oil dispersant, and an exemplary plasticizer is dibutyl phthalate. Further, as will be discussed more fully below, the presence of transition metal oxides in the slurry (or paste) can cause a catalytic combustion reaction during sintering. Thus, in embodiments, the slurry (or paste) may contain additives to prevent or reduce the severity of such combustion reactions. In particular, the slurry (or paste) may contain an antioxidant, such as a phenol (e.g., butylated hydroxytoluene (BHT) or alkylated-diphenylamine), or materials with an endothermic decomposition like inorganic carbonates and hydroxides.

The slurry (or paste) is tape cast or extruded into a green tape having the desired thickness of the sintered electrode. As discussed above, the thickness may be in the range of from 5 µm to 100 µm. In embodiments, the green tape is dried to remove a substantial portion of the solvent, leaving primarily the chalcogenide compound containing the alkali metal or alkaline earth metal. In embodiments, drying may occur at ambient temperature or at a slightly elevated temperature of 60° C. to 80° C. (or begin at an ambient temperature and transition to an elevated temperature). Additionally, in embodiments, air is circulated to enhance drying. In embodiments, the amount of organic material remaining after drying is no more than 10% by weight of the dried green tape. Upon drying the green tape is debound and sintered. That is, the green tape is heated to a temperature at which the polymer binder and any other organics are burned off. In embodiments, debinding occurs in the temperature range of 175° C. to 350° C. Thereafter, the dried and debound green tape is sintered. Sintering occurs in the temperature range of 500° C. to 1350° C. Sintering time in this temperature range is less than 60 minutes. In embodiments, sintering time is less than 50 minutes, and in still other embodiments, sintering time is less than 45 minutes. Upon sintering, the sintered electrode has a porosity of no more than 30%. In embodiments, the sintered electrode tape has a porosity of no more than 25%. In other embodiments, the sintered electrode has a porosity of no more than 20%, and in still other embodiments, the sintered electrode has a porosity of no more than 15%. In embodiments, the porosity of the sintered electrode is at least 0.1%. As a result of the sintering process, in embodiments, the sintered electrode has on average a grain size of from 10 nm to 50 µm. In other embodiments, the grain size on average is from 50 nm to 10 µm, and in still other embodiments, the grain size on average is from 100 nm to 1000 nm.

Further, in embodiments, the sintered electrode has an open porosity such that fluid communication is provided from a first major surface of the sintered electrode to the other major surface. That is, in embodiments, the chalcogenide compound phase comprises a solid phase, and the porosity comprises a second phase in which the second phase is a continuous phase in the solid phase. Additionally, in embodiments, the pores of the sintered electrode tape are substantially aligned to promote ion transport. That is, the pores are aligned along an axis perpendicular to the first and second major surfaces. For example, each pore may have a cross-sectional dimension that is longer than any other cross-sectional dimension of the pore, and the longer cross-section dimension is substantially aligned perpendicularly to the first and second major surfaces of the electrode, e.g., on average, aligned to within 25° of perpendicular. Advantageously, in contrast to other sintered electrodes, the sintering process described produces a sintered electrode that requires no further finishing, such as mechanical grinding or polishing, prior to incorporating into a battery architecture. In particular, previous sintered electrodes were formed from large discs at much greater thicknesses, e.g., 500 µm to 1 mm, and had to be diced to usable dimensions and ground down to a usable thickness. Such grinding has reportedly only been able to achieve a thickness of about 130 µm, which is the practical limit for electrodes manufactured according to such processes. By tape-casting the electrode, not only is the process made more economical (e.g., no grinding/polishing steps and ability to utilize roll-to-roll fabrication), but also desirable thicknesses of the electrode material can be achieved.

Further, because the sintered electrode is self-supporting, the sintered electrode can be used as a substrate for deposition of additional layers. For example, a metallic layer (e.g., up to 5 µm) can be deposited onto a surface of the sintered electrode to serve as a current collector for a battery. Additionally, in an exemplary embodiment, a solid electrolyte, such as lithium-phosphorous-oxynitride (LiPON), lithium garnet (e.g., garnet LLZO ($Li_7La_3Zr_2O_{12}$)), or lithium phosphosulfide, may be deposited by RF-sputtering onto the sintered electrode. Alternatively, a thin layer of LiPON solid electrolyte can be applied through ammonolysis of a thin layer of $Li_3PO_4$ or $LiPO_3$ or through reactive sintering. Such processes are envisioned to be faster and potentially less capital intensive than conventional deposition techniques for solid electrolytes. Similarly, a solid electrolyte of lithium garnet (e.g., LLZO) can be applied by sol-gel, direct sintering, and reactive sintering.

Further, as a self-supporting layer, the sintered electrode can provide the basis for an advantaged manufacturing approach for lithium batteries that use a liquid electrolyte. In particular, the sintered electrode can be made in a continuous process and used as a substrate for coating in either batch or roll-to-roll processing. Such processing could allow, for example, metallization of the sintered electrode by sputtering and/or electrolytic deposition to form a metallized sintered electrode. In this way, the thickness of the electrode current collector metal can for a conventional lithium battery can be reduced from the typical thickness of 10-15 µm to less than 5 µm, less than 1 µm, or even less than 100 nm. Further, the metallized sintered electrode can be supplied in piece or roll form as a stand-alone component to a battery cell manufacturer. Advantageously, such metallized sintered electrodes reduce the volume of the cell typically reserved for the current collector, allowing for more active electrode material and higher capacity.

In this regard, the sintered electrode is particularly suitable for use in ion intercalation type batteries. An exemplary embodiment of a lithium-ion battery 10 is shown in FIG. 1. The lithium-ion battery 10 includes a sintered cathode 12, an electrolyte layer or region 14, and an anode 16. In embodiments, the sintered cathode 12 has a thickness of from 5 µm to 100 µm. Additionally, in embodiments, the sintered cathode 12 has a cross-sectional area of at least 3 $cm^2$. Advantageously, the sintered cathode 12 mechanically supports the lithium-ion battery 10 such that the sintered cathode 12 is not carried on a mechanical support, such as a zirconia support. The advantage of this architecture is that inactive components are substantially excluded from the battery. That is, while providing the function of a mechanical support, the sintered cathode 12 is still an active component and contributes to the capacity of the battery. Accordingly, the cathode-supported design can give the same overall capacity in a thinner form-factor, or the thickness of the cathode can be increased for a higher net capacity at the same size.

Further, the sintered cathode 12 can be used in both solid-state and liquid electrolyte lithium-ion batteries. In particular, in a solid-state battery, the electrolyte layer 14 includes a solid-state electrolyte (e.g., having a conductivity of >$10^{-6}$ S/cm), such as LiPON, lithium garnet (e.g., LLZO), or lithium phosphosulfide. More particularly, in a solid-state battery, the electrolyte layer 14 includes a solid electrolyte, such as LiPON, lithium garnet (e.g., LLZO), lithium phosphosulfide, or lithium super ionic conductor (LISICON), with a combination of lithium ion conductivity and thickness such that the area specific resistance is less than about 100 $\Omega cm^2$. One advantage of LiPON, in particular, is that it is resistant to dendrite formation. In a liquid electrolyte battery, the electrolyte layer 14 includes a liquid electrolyte, such as $LiPF_6$-DMC (lithium hexafluorophosphate in dimethyl carbonate), and a polymer or ceramic separator to separate the cathode 12 and anode 16. In either case, the sintered cathode 12 increases the charge capacity over conventional lithium-ion batteries.

The battery 10 also includes a first current collector 18 disposed on a first surface of the sintered cathode 12. In the embodiment depicted, a second current collector 20 is disposed on the anode 16; however, in embodiments, the anode may be a metal (such as lithium metal or magnesium metal) in which case a current collector may be excluded. Further, in the embodiment depicted, the battery 10 is encased in a protective coating 22. In embodiments, the first current collector 18 is copper, and the second current collector 20 (when used) is aluminum. The protective coating 22 may be, e.g., parylene.

While the depicted embodiment only includes a sintered cathode 12, the anode 16 may also be a sintered electrode according to the present disclosure. For a lithium-ion battery, the (sintered) cathode 12 may include at least one of lithium cobaltite, lithium manganite spinel, lithium nickel cobalt aluminate, lithium iron phosphate, lithium cobalt phosphate, lithium nickel manganate, or lithium titanium sulfide, and the (sintered) anode 16 may include at least one of lithium titanate or lithium niobium tungstate.

Additionally, while a lithium-ion battery is depicted, the battery could instead be based on sodium-ion, calcium-ion, or magnesium-ion chemistries. For a sodium-ion battery, the (sintered) cathode 12 may include at least one of $NaMnO_2$, $Na_{2/3}Mn_{1-y}Mg_yO_2$ (0<y<1), or $NaVPO_4F$, and the (sintered) anode 16 may include at least one of $Na_2Li_2Ti_5O_{12}$ or $Na_2Ti_3O_7$. For a magnesium-ion battery, the (sintered) cathode 12 may include at least one of $MgCr_2O_4$ or $MgMn_2O_4$, and the anode 16 may magnesium metal (which could also serve as the current collector 20). Any of the foregoing battery chemistries may utilize a liquid electrolyte comprising a solvent (e.g., DMC) and a salt with a cation matching the intercalant ion. Additionally, for a sodium-ion battery, sodium super ionic conductor (NASICON) may be used as a solid-state electrolyte.

Figure 2:
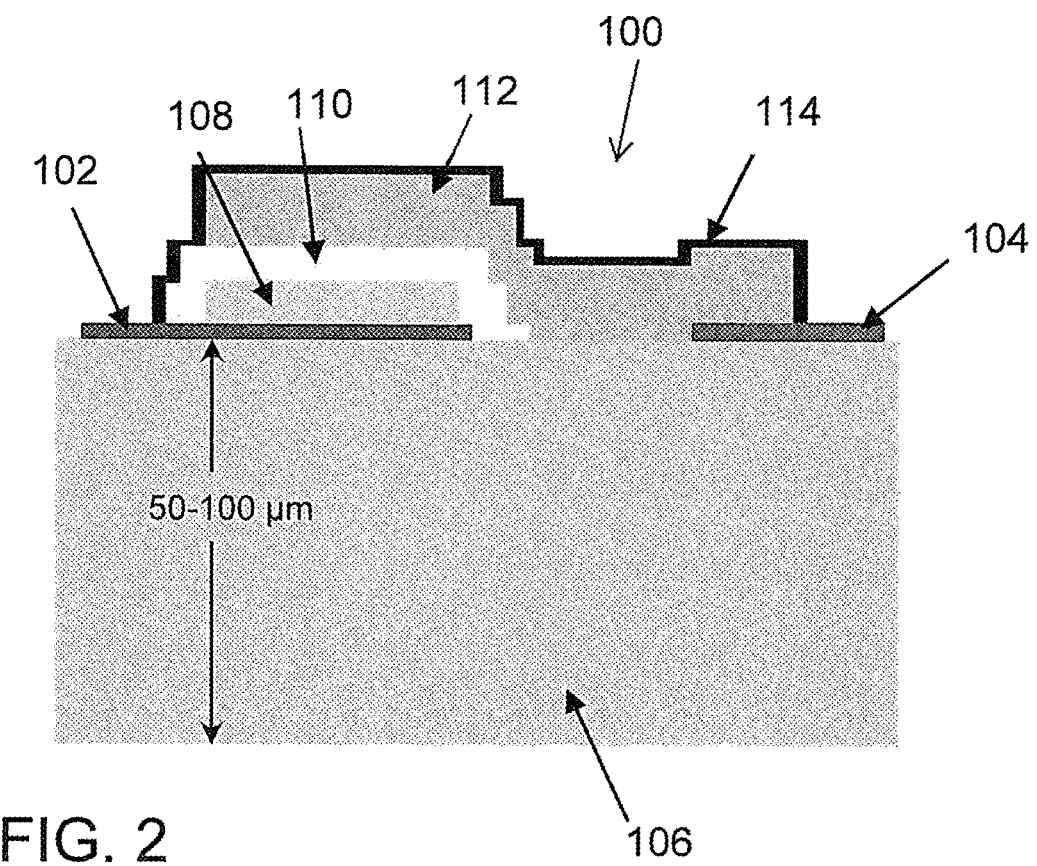
FIG. 2 is a schematic, cross-sectional view of another lithium-ion battery.

For the purposes of demonstrating the gain in capacity, FIG. 2 provides a schematic cross-section of a conventional solid-state, thin-film micro-battery 100. The micro-battery 100 includes a cathode current collector 102 and an anode current collector 104 deposited onto an inert mechanical support 106. A cathode 108 (e.g., LCO or LMO) is formed onto the cathode current collector 102 and is surrounded by a solid-state electrolyte 110 (e.g., LiPON). An anode 112 is deposited over the electrolyte 110 and over the anode current collector 104. A coating 114 is provided to protect the cathode 108, electrolyte 110, and anode 112. In the conventional battery design, the mechanical support 106 is relied upon for handling during fabrication of the battery 100 and is the platform for the deposition of the cathode 108 and electrolyte 110 layers. The mechanical support 106 typically has a thickness of 50 µm to 100 µm. The mechanical support 106 and the protective coating 114 also provide rigidity in the final package and help prevent damage.

In these conventional batteries 100, the cathode 108 is typically grown to desired thickness by processes such as RF sputtering or pulsed laser deposition. These deposition techniques are another reason why the conventional battery 100 requires the use of mechanical support 106. Such conventional methods produce cathode materials at a rate of <10 µm/hr, which creates a practical and commercial limit to the achievable thicknesses of these conventional cathode materials. As a consequence, thin film micro-batteries have only found applications where small size power sources are needed like smart cards, medical implants, RFID tags, and wireless sensing.

Figure 3:
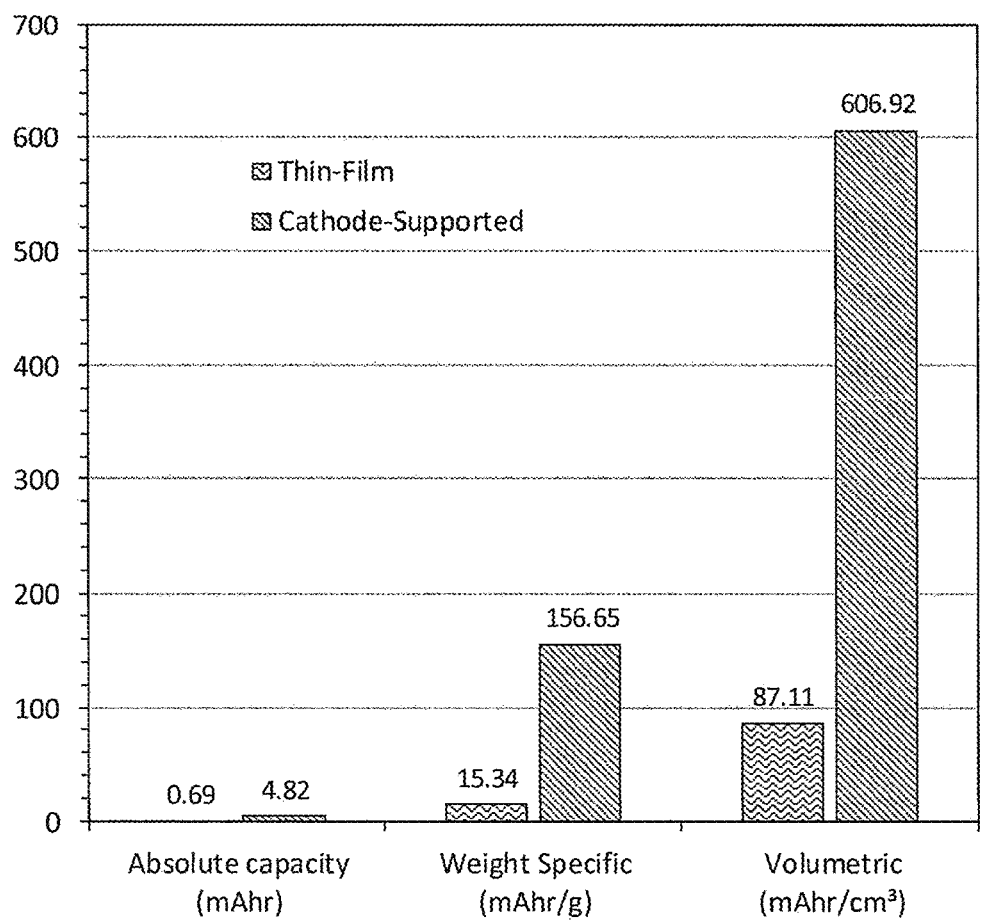
FIG. 3 is graph of the charge capacity of the battery of FIG. 1 as compared to the charge capacity of the battery of FIG. 2.

A comparison of the charge capacity of battery 10 of FIG. 1 according to the present disclosure and the charge capacity conventional battery 100 of FIG. 2 is shown in FIG. 3. The comparison is made at nominally identical thicknesses of 80 µm. In particular, the comparison is made between (1) a conventional battery 100 having a 50 µm thick mechanical support 106 of zirconia and a cathode that is 5 µm thick and (2) the presently disclosed battery 10 having a cathode 12 that is 35 µm thick. Notably, the thickness of the cathode 12 of the presently disclosed battery 10 is less than the thickness of the mechanical support 106 of the conventional battery 100, allowing space to be reserved for lithium metal at the anode 16. As can be seen in FIG. 3, the extra thickness of the sintered cathode 12 and removal of the mechanical support 106 provides a seven-fold higher capacity in absolute and volumetric terms, and the capacity is ten-fold greater on a weight basis.

Besides simply allowing for a larger electrode, the sintered cathode 12 of the depicted embodiment also provides structural advantages that increase its charge capacity over conventional cathodes. In a conventional cathode 108, the active cathode particles make point contacts. The cross-sectional areas of the contacts are small and so have a high impedance to movement of lithium ions and electrons. In order to overcome this impedance issue, carbon is added to the electrode as a conductive pathway to facilitate transport of electrons into and out of the active particles, and pore space in the electrodes are infiltrated with liquid electrolyte for fast conduction of lithium ions. The use of carbon in this manner creates a tradeoff between capacity of the batter and charge/charge rate performance. The other issue with the point contacts between the active cathode particles is that they are weak, and so polyvinyl fluoride (PVF) is used to bind the active particles and carbon together to give the structure strength during processing. In contrast, particles in the depicted sintered cathode 12 are bonded to one another, and so, the electronically conductive carbon and binder may be eliminated. In this way, the proportion of space allocated to porosity for movement of lithium ions may be reduced, and more space can be dedicated to active material with a sintered cathode. The inventors estimate that for a given cathode material, the capacity in aggregate can be raised by approximately 30% on the basis of equal cathode thicknesses. Alternatively, the cathode thickness could be reduced by 20-25% while keeping the capacity the same for a more compact battery. As mentioned above, the pores in the sintered cathode 12 can be aligned in the direction of transport of ions to and from the anode so as to enable further improvements in space utilization or to boost power density.

EXPERIMENTAL EXAMPLES

Five exemplary green tapes, including one comparative example (E1), one reference example (E4) and three examples according to the present disclosure (E2, E3, and E5), were prepared by tape casting the slurries described in Table 2. The LMO and LCO powders were obtained commercially from GELON LIB GROUP (Linyi, Shandong, China), and the alumina powder was obtained from Sasol (Houston, Tex.). The polyvinyl butyral binder was Butvar® B-79 obtained commercially from Eastman Chemical Company (Kingsport, Tenn.).

TABLE 2

Formulations of tape casting slurries

| Slurry Component | Weight Percentages | | | | |
|---|---|---|---|---|---|
| | E1 | E2 | E3 | E4 | E5 |
| $LiMn_2O_4$ (LMO) | 48.98 | 52.58 | | | |
| $LiCoO_2$ (LCO) | | | 52.58 | | 64.96 |
| Alumina | | | | 52.58 | |
| 1-Methoxy-2-propanyl acetate (MPA) | 44.24 | 42.25 | 42.25 | 42.25 | 32.09 |
| Fish-Oil Dispersant | 0.85 | 0.84 | 0.84 | 0.85 | 0.64 |
| Dibutyl phthalate | 0.98 | 0.84 | 0.84 | 0.84 | 0.64 |
| Polyvinyl butyral binder | 4.95 | 3.49 | 3.49 | 3.49 | 1.69 |
| Total non-volatile organics without MPA | 12.17 | 8.95 | 8.95 | 8.95 | 4.35 |

Figure 4:
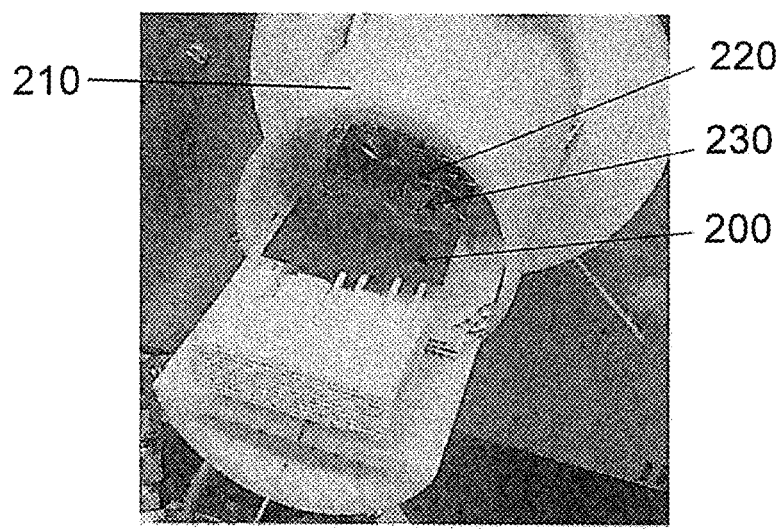
FIG. 4 depicts a green tape being sintered and illustrating the issue of flammability according to conventional sintering processes.

Tapes that contain lithium-ion battery electrode materials with concentrations of organics above 10% by weight are difficult to rapidly debind and fire. In particular, when the concentration of organic material is above 10% by weight, the tape may become flammable and ignite if a critical temperature is exceeded before binder is removed. Once ignited a combustion front propagates and cracks the tape. FIG. 4 depicts tape E1 of Table 2 in which the green tape 200 has entered the sintering chamber 210, and the binder has combusted 220, creating a propagation front 230. As can be seen in Table 2, the organic component of green tape E1 is 12.17% by weight, which is above the threshold of 10% by weight. The flammability of the tape is a process bottleneck that limits the practical rate of continuous debinding and firing to about 60 minutes. As mentioned briefly above, the flammability of green tape E1 results in part from the interaction between the reducible transition metal oxide in the electrode material and the organic materials. In particular, the transition metal oxides speed combustion by acting as a catalyst and by producing oxygen.

Figure 5:
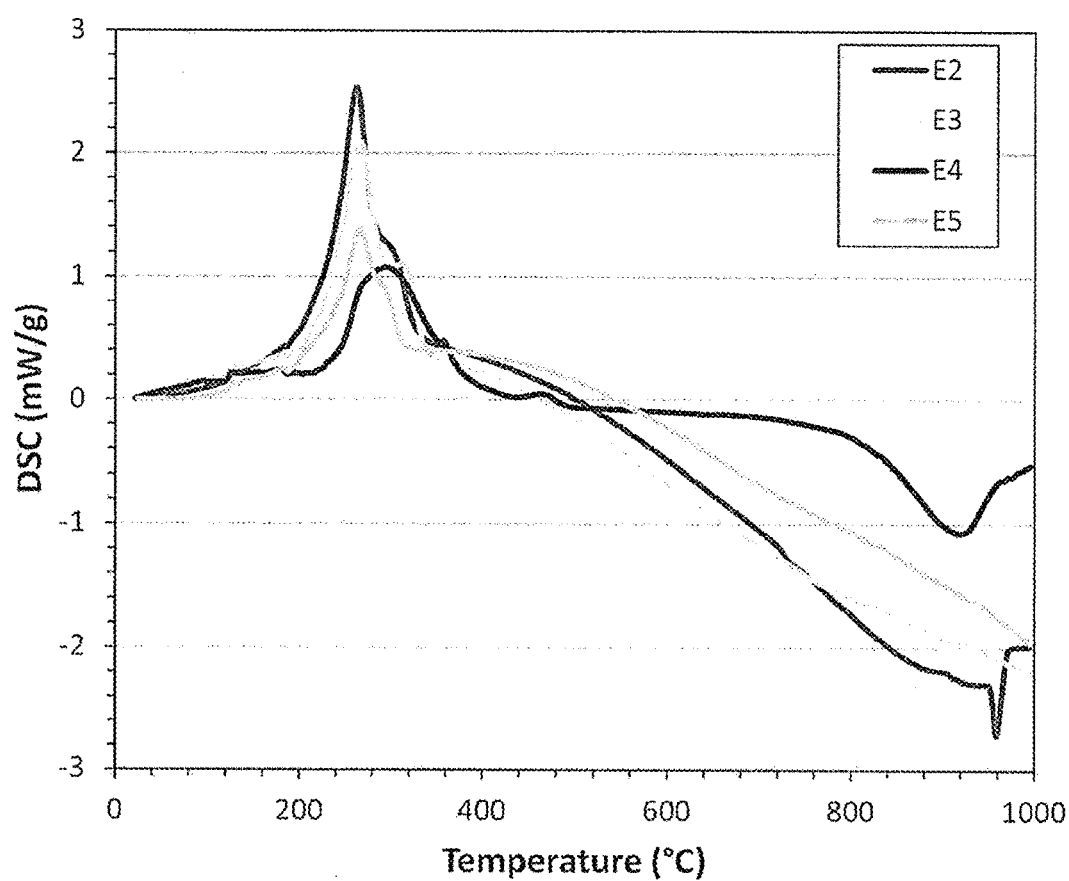
FIG. 5 depicts a graph of DSC curves illustrating heat release as a function of temperature during drying/sintering.

The effect is illustrated in differential scanning calorimetry (DSC) traces shown in FIG. 5. As can be seen there, tapes E2 and E3 contain LMO and LCO, respectively, and begin to combust at approximately 80° C. lower than reference tape E4 with alumina (which does not contain a transition metal). In comparison to tape E4, the total amount of heat released for tapes E2 and E3 is greater because LMO and LCO of tapes E2 and E3, respectively, promote more complete combustion of organics while volatile oxides escape the alumina tape E4. However, as can be seen in the trace of tape E5 in which the amount of organic material is below 5% by weight, the heat released becomes comparable to the alumina reference tape E4. That is, for tape E5, the concentration of combustible organics was reduced by more than half to just 4.35% by weight. While the temperature for onset of combustion is the same, the total amount of released heat drops in concert with the change in concentration of organics relative to tape E4. At the lower binder concentration, the tape may be debound and sintered at significantly higher speeds.

Despite the much lower binder concentration, it was surprisingly found that tape E5 was sufficiently strong for release from the polymer carrier film and for manual handling. FIGS. 6 and 7 provide pictures of two examples of tape E5 that were rapidly sintered. The size of each tape was approximately 8 cm long by 4 cm wide. The tape in FIG. 6A was debound by pulling through the furnace at 300° C. in a first pass and then sintering in a second pass at 1100° C. Each pass lasted for ten minutes for a total processing time of 20 min. The example in FIG. 6B was debound and sintered in a single step by pulling into the furnace at 1100° C. at a rate of 32 in/min (total residence time of 75 seconds). The sintered thickness of the tape E5 was nominally 60 μm.

The rapid sintering can be operated in a continuous fashion working with individual pieces or in a roll-to-roll configuration. The process efficiently produces large areas of sintered electrode material with thicknesses relevant for batteries. FIG. 7 is an example of continuously and rapidly sintered tape of the E5 formulation that approximately 40 mm wide by 600 mm long and is 70 μm thick. Debinding and sintering were conducted in a single step with a total residence time of 20 min at a maximum temperature of 1100° C.

Besides lowering the concentration of combustible organics in the green tape, other means to lessen flammability are envisioned. As mentioned above, combustion may be slowed by the addition of a small quantity of antioxidant to the slurry. Additionally, the powder component may be selected based on the ability of the powdered compounds to undergo an endothermic reaction in the temperature range of 200° C. to 300° C. For example, to produce the LCO or LMO, $CoCO_3$ or $MnCO_3$ may be included in the slip along with a balance of $Li_2CO_3$ for reaction to form $LiCO_2$ (LCO) or $LiMn_2O_4$ (LMO) during the sinter step. Decomposition of either carbonate takes place between 150° C. and 300° C., and the process is endothermic, thereby inhibiting combustion. In this way, the amount of binder material can be increased as desired, e.g., for strengthening of the green tape.

Figure 8:
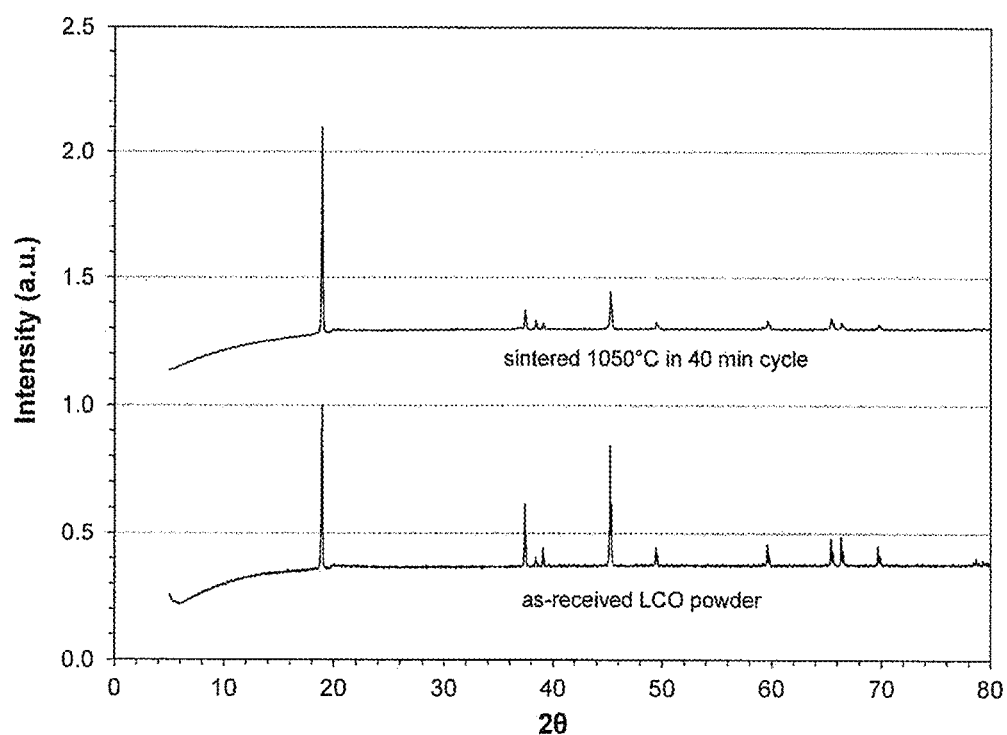
FIG. 8 is a comparison of the XRD spectra for the sintered LCO tape as compared to the as-received LCO powder.
Figure 9:
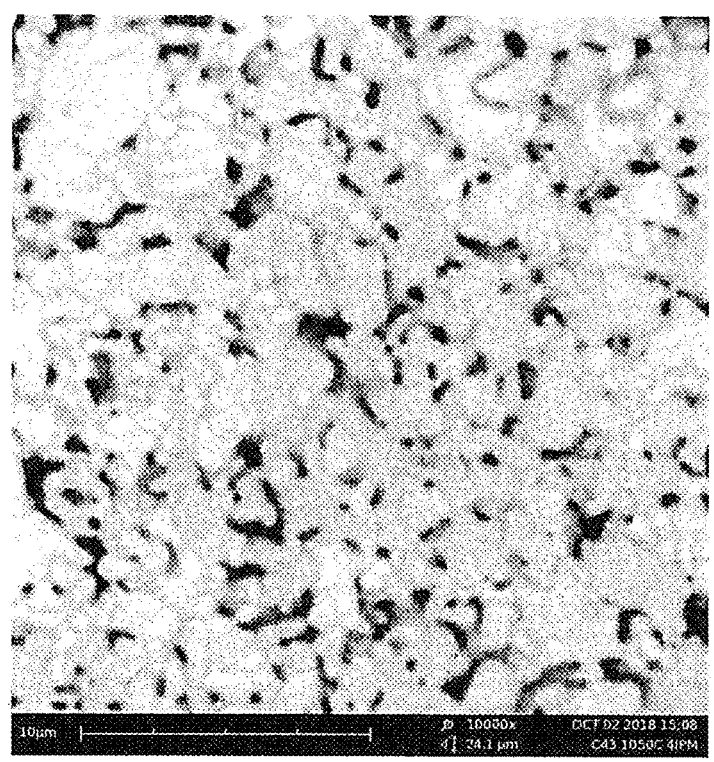
FIG. 9 is an SEM image of an as-fired LCO tape sintered at 1050° C. for 40 min.

A coupon of LCO tape composition E5 that measured 90 cm by 40 cm was sintered at 1050° C. in a cycle with a total duration of 40 minutes. The as-sintered tape had a nominal thickness of 60 μm. As shown in FIG. 8, powder x-ray diffraction confirmed that the chemistry and structure of the sintered LCO is similar to that of the as-received LCO. FIG. 9 is an SEM image of the sintered tape's as-fired surface. The porosity was estimated to be 8-10% by image analysis, and the pore structure was determined to be open via a dye test.

Figures 10A, 10B:
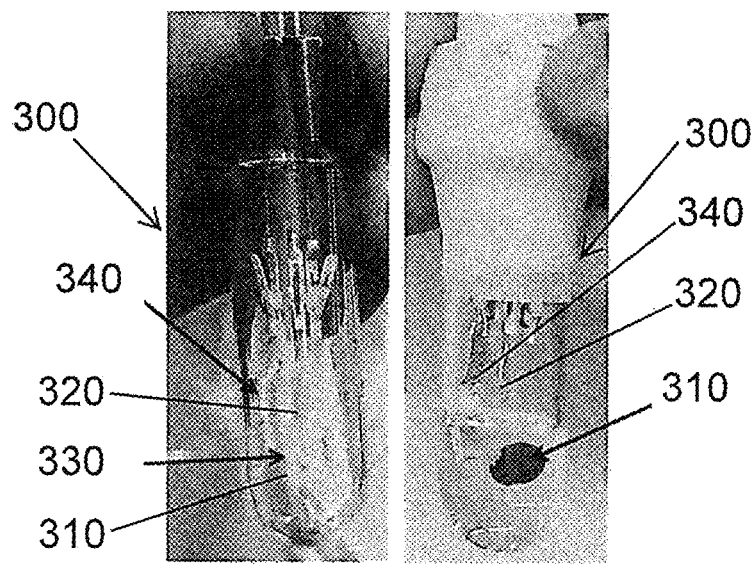
FIGS. 10A and 10B are pictures of an electrochemical cell having a sintered cathode according to an exemplary embodiment.
Figure 11:
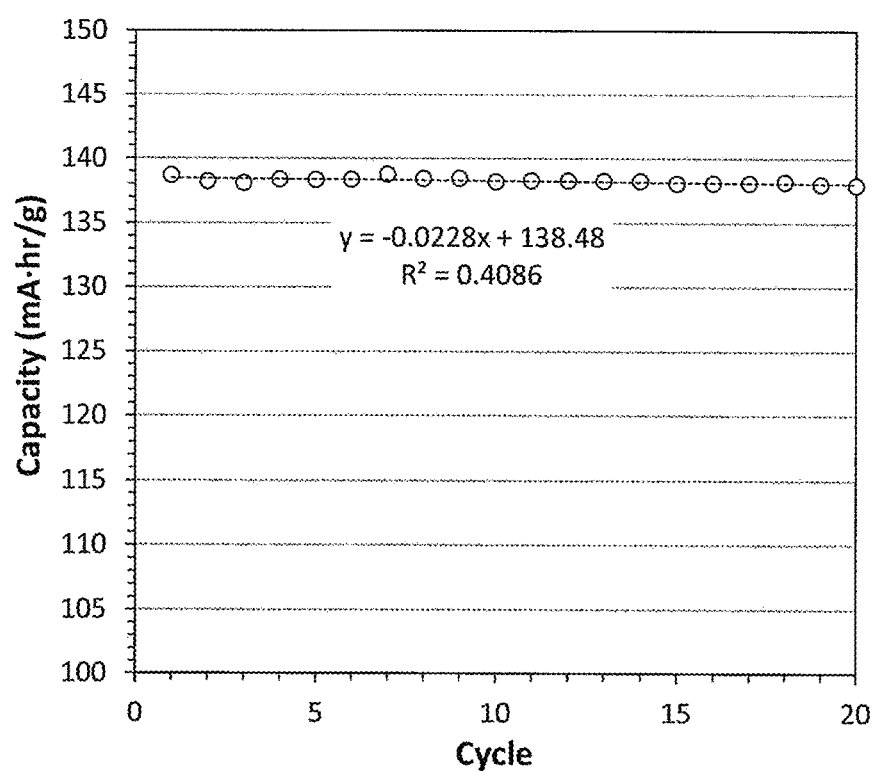
FIG. 11 depicts a graph of charging capacity as a function of the number of charge/discharge cycles for the electrochemical cell of FIGS. 10A and 10B.
Figure 12:
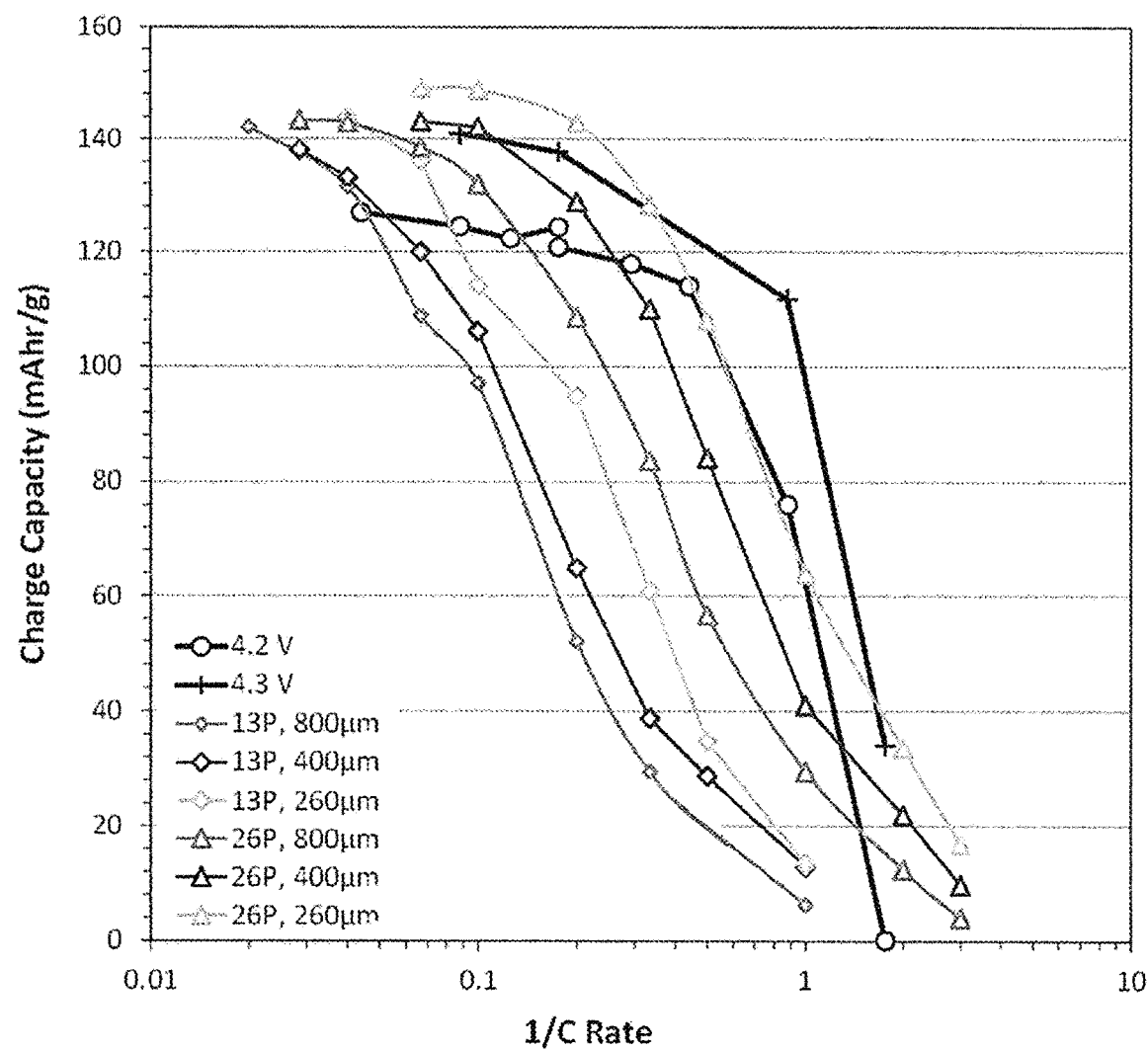
FIG. 12 depicts a graph of charging capacity for the electrochemical cell of FIGS. 10A and 10B as compared to other cathode materials having different porosities and thicknesses.

The charge capacity of the exemplary tape cast and sintered electrode was determined by preparing an electrochemical cell 300 as shown in FIGS. 10A and 10B. A cathode disc 310 of the sintered electrode was laser cut to a diameter of 8 mm. Electrical connection to the cathode disc 310 was made with a 4 mil platinum wire 320 that was secured by gold ink 330. The gold ink also fully covered one face of the cathode disc 310 as shown in FIG. 10A so as to force transport of lithium ions through the other face shown in FIG. 10B. The anode 340 was selected to be lithium metal, which also served as a reference electrode. The cathode disc 310 was immersed in a solution of 1 M $LiPF_6$ in 50:50 ethylene carbonate and dimethyl carbonate electrolyte (BASF Selectilyte LP-30) such that the pores were filled with the conductive fluid. The sample was subjected to charge-discharge cycling at rates of C/20 to 2 C. Charging was performed under constant current and then constant voltage charging with 4.2 or 4.3 V potentials. Discharge was at constant current and down to 3 V limit. FIG. 11 shows the charge capacity and stability of the sintered LCO cathode disc 310 through twenty charge-discharge cycles at a C/5 rate and 4.3 V charging potential. The capacity closely matches the theoretical value of 140 mAhr/g for LCO, and there is no evidence of fade in capacity as cycles are accumulated. Thus, the tape cast and rapidly sintered LCO showed near theoretical capacity in the testing of the electrochemical cell. The rapidly sintered LCO electrode also retained high capacity as charging speed increased. As shown in FIG. 12, there is little drop in capacity even as charging speed is increased at fixed potentials of 4.2 and 4.3 V up C/2.

Figure 13A:
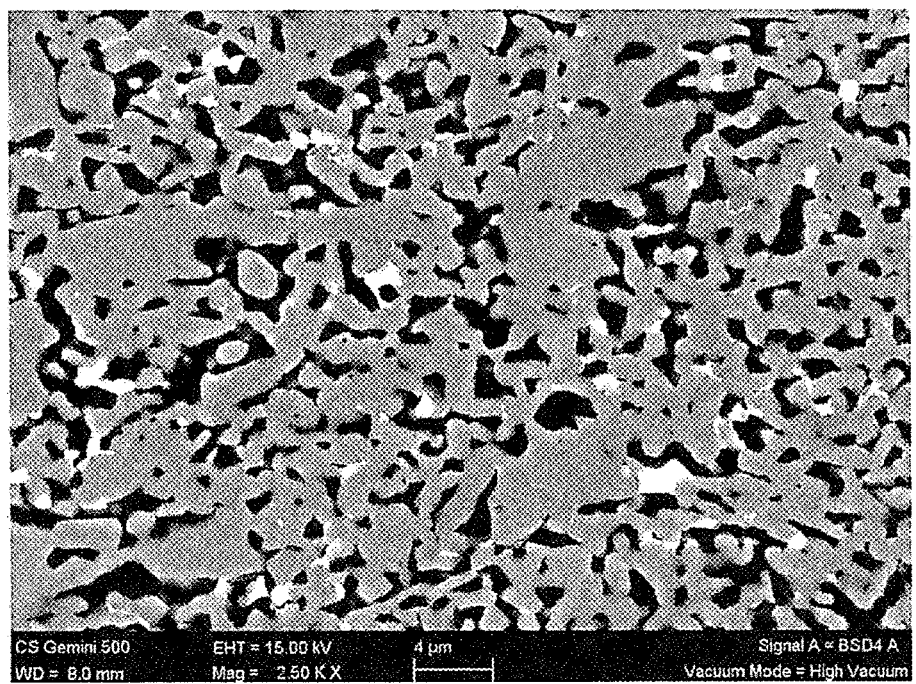
FIGS. 13A and 13B depict SEM images of the microstructure of LCO immediately after sintering and after charge-discharge cycling, respectively.
Figure 13B:
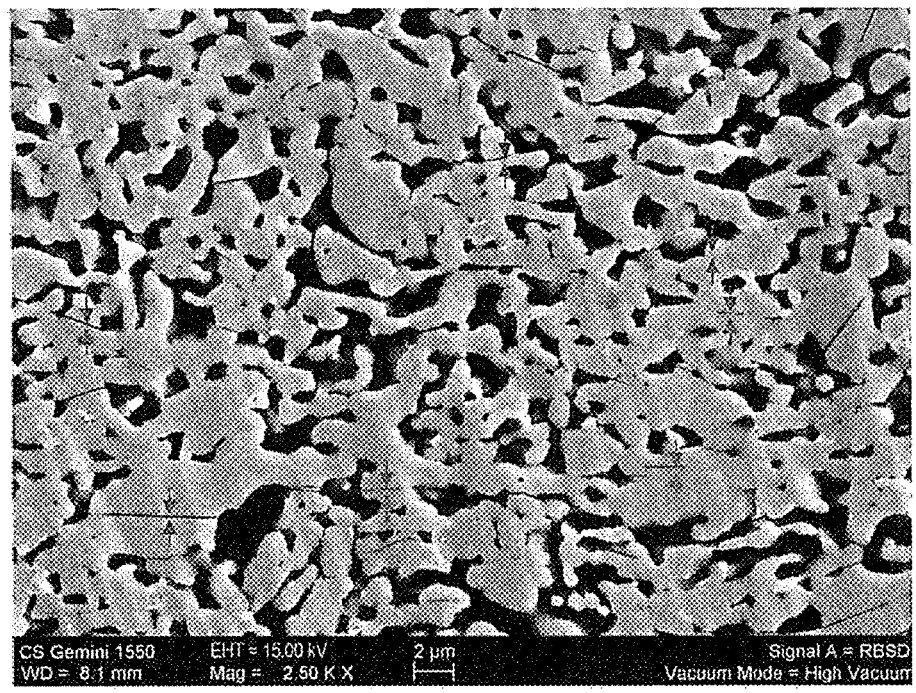
Figure 14:
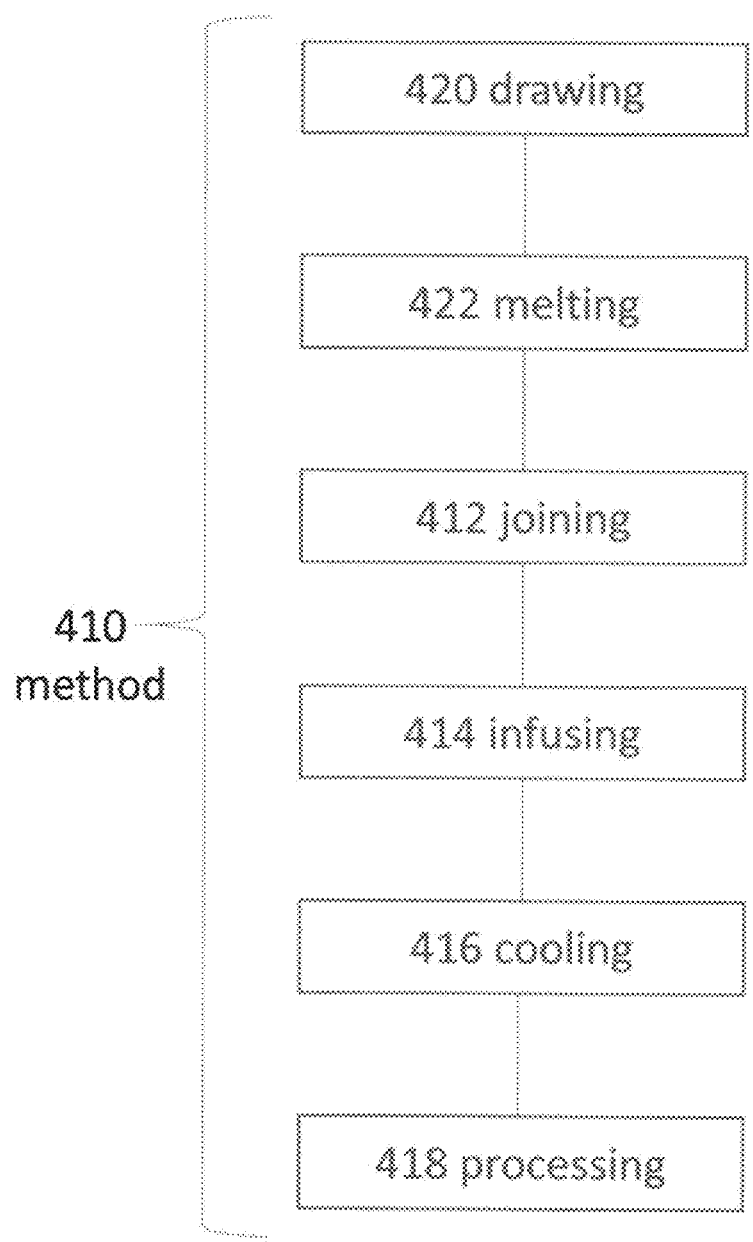
FIG. 14 is a conceptual diagram of an energy device (e.g., cell, battery, energy storage device) according to an exemplary embodiment.

The inventors were surprised by the unexpected result that capacity was retained through multiple charge-discharge cycles. A fade or even abrupt failure had been expected from cracking of the brittle sintered electrode. There are two mechanisms known to drive cracking. One is a large bulk strain in the electrode with intercalation and de-intercalation of lithium. Mismatch strains arising from differential states of charge through the thickness of the electrode, especially when charging or discharging at high rates, tend to exceed the strain tolerance of a brittle ceramic. LCO and most other electrode materials, such as LFP, are anisotropic, and so, differential expansion on charge-discharge cycling drives microcracking. The cracks are thought to break up the electrode leading to formation of isolated islands and increase tortuosity for transport of electrons. The microstructure of LCO immediately after sintering is shown in FIG. 13A, and the microstructure of LCO after charge-discharge cycling is shown in FIG. 13B. As can be seen in a comparison of FIGS. 13A and 13B, microcracks have developed after charge-discharge cycling. While such microcracks did not affect the charge capacity of the LCO electrode, the microcracks could be avoided by making the grain size sufficiently small.

The plot in FIG. 12 also makes a comparison with thicker conventionally sintered and machined cathodes. According to the literature, the cathodes were sintered from 12.5 mm diameter pressed pellets of LCO in a bed of the same powder to limit loss of lithium. The heating rate was 9° C./min and soak time was 90 min. The sintered pills were ground to remove a dense outer shell, polished to 5 μm roughness and diced into 2.2 mm square sections. The diced pieces were finished to a thickness down to 260 μm, had two levels of open porosity (13% and 26%), and were evaluated for potential use as high capacity and energy density microbatteries. The cells utilized liquid electrolyte and conventional porous polymer separator. There were two differences in testing conditions. In particular, the cells were charged at constant current up to a potential of 4.25 V and discharged down to 2.5 V. In the conventionally produced cathode, porosity was important for infiltration by liquid electrolyte to provide a more conductive pathway for lithium ions than is available from the LCO alone. The importance of the pores grows as the thickness of the electrode increases. Even at 26% porosity, the thinnest 260 μm cathode showed a marked drops in charge capacity charging at a rate of C/3. As such, the conventional cathodes present a difficult trade-off between volumetric capacity and charging rate. That is, porosity must be added to reach faster charging rates, but this comes at the expense of capacity.

In contrast, the sintered electrode disclosed herein was made in a thinner form factor of 60 μm without the need to employ costly machining processes. The thickness is not reduced to such an extent that it becomes small in proportion to thicknesses of other components, such as 1-2 μm layer of LiPON electrolyte in a thin film battery. However, its thickness is still roughly a factor of four less than the conventional cathodes referenced in FIG. 12. As such, transport distances for lithium ions and electrons are shortened, and capacity is retained to high charging speeds with little dependence on porosity to hold a lithium conducting electrolyte. The capacity of the sintered cathode at one C is more than 80% of theoretical at a current density of 3.5 mA/cm$^2$.

Some embodiments relate to a method 410 of manufacturing an energy device. The method 410 includes steps of joining 412 hot solid electrolyte, such as lithium phosphosulfide (LPS), $Li_2S$—$SiS_2$—$Li_4SiO_4$, other solid electrolytes disclosed herein, to a porous, self-supporting sheet of sintered electrode material, such as lithium electrode material, LCO, LMO, other electrode materials disclosed herein. LPS may be a particularly difficult solid electrolyte material to employ effectively without binder or at high temperature due to tendency to leach lithium, such as when heated for a long duration. However, aspects of the presently disclosed technology, such as use of electrode material as a mechanical support, may uniquely allow LPS to be quickly melted on and/or into the electrode, at high temperature and without losing too much lithium.

Accordingly, the hot solid electrolyte may be at a temperature above 200° C., above 500° C., and/or above 700° C. According to an exemplary embodiment, the hot solid electrolyte is in a fluid state, thereby allowing the solid electrolyte to solidify and bond to itself and form a single, continuous and contiguous solid layer that is mechanically supported by the underlying electrode. For example, the solid electrolyte overlaying the electrode may have a density of at least 90%, such as at least 95%, such as at least 99%, and/or at least 90% by volume of the solid electrolyte may consist of a glassy or crystalline solid electrolyte, such as LPS or another lithium electrolyte, such as at least 95%, such as at least 99%. Such a continuous layer of melt processed solid electrolyte (e.g., inorganic crystalline or amorphous glassy solid electrolyte having a melting temperature above 200° C.; lithium solid electrolyte) may contrast with other manufacturing approaches, which may include pressing solid electrolyte particles in organic binder onto electrode material, where the binder takes up space and reduces ionic performance of the device.

According to an exemplary embodiment, the method 410 further includes a step of infusing 414 the hot solid electrolyte into porous passages of the sheet of sintered electrode material, such as infusing melted LPS into a self-supporting sheet of LCO or LMO, for example. Vacuum pressure, capillary action/wicking, etc. may facilitate the infusing 414.

According to an exemplary embodiment, the method 410 further includes a step of cooling 416 and/or solidifying the solid electrolyte, such as cooling melted LPS to room temperature of 27° C. The cooling 416 may be such that the solid electrolyte solidifies while the solid electrolyte extends into the passages of the sheet of sintered electrode material. As a result, the interface between the solid electrolyte and the electrode material may be far greater in terms of area than just the geometric footprint of the interfacing surfaces. The infusing 414 and/or joining 412 steps may be performed in a controlled environment, such as in an inert gas atmosphere. Further, the joining 412 may be done rapidly, such as in less than 60 minutes, less than 40 minutes, and/or less than 5 minutes, before the cooling 416, which may mitigate loss of lithium and/or other compositional constituents due to leaching. Lasers may be used to melt the solid electrolyte.

In some embodiments, prior to the step of joining 412 hot solid electrolyte, the sheet of sintered electrode material may be self-supporting such that, for example, the sheet may be held vertically, i.e. oriented lengthwise vertically and held at one end without additional supports or carriers, to a height of 2 meters, 3 meters, 5 meters without falling apart under its own weight, such as where the sheet of sintered electrode material has a long length of at least 2 meters, 10 meters, 30 meters. Also, the method 410 may further include other processing 418, such as singulating (i.e., cutting into pieces) the sheet into smaller sheets, encapsulating both the sheet of sintered electrode material and solid electrolyte in a protective or insulating coating, such as a dielectric polymer.

According to an exemplary embodiment, a self-supporting sheet of sintered electrode material may be drawn through melted solid electrolyte and/or a precursor to solid electrolyte to coat the sheet of sintered electrode material with the solid electrolyte. As such, some embodiments include a step of drawing 420 the sheet of sintered electrode material through a fluid, such as a sol-gel comprising solid electrolyte particles. The sheet may be drawn at a rate to deposit a layer of solid electrolyte on the sheet that corresponds to a thickness of at least 1 µm and no more than 100 µm after a later step 416 of cooling the solid electrolyte. In other embodiments, the sheet may be sprayed with electrolyte in powder or soot form, which may subsequently be heated (e.g., sintered, fused, laser heated) to melt the electrolyte. In still other embodiments, solid (or liquid) electrolyte may be deposited or otherwise applied as discussed herein.

In some embodiments, prior to the step of joining 412, the method 410 further includes a step of melting 422 the solid electrolyte, such as heating the solid electrolyte above a liquidus temperature or to a fluid state. The melting 422 may occur while the solid electrolyte (then in the fluid state) is overlaying and contacting the sheet of sintered electrode material. In the fluid state, the solid electrolyte may be drawn into pores or passages in the electrode. As a result, the method 410 may provide higher energy density, smaller size, lighter weight, and lower cost at least because the solid electrolyte may be processed at high temperature on the self-supporting sheet, and may be binder-less and infused into the sintered electrode material.

Figure 15:
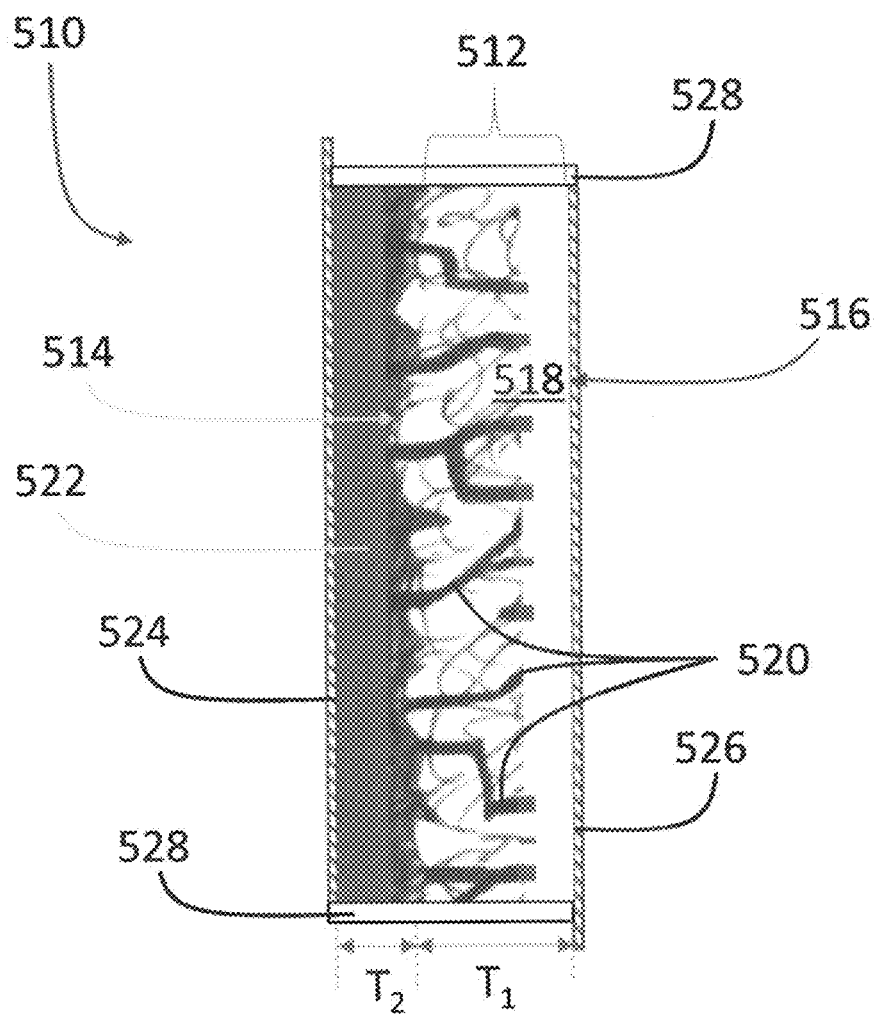
FIG. 15 is a flow diagram of a method of manufacturing an energy device according to an exemplary embodiment.

Referring now to FIG. 15, an energy device 510 (e.g., battery, cell, lithium-ion battery, solid-state cell, fuel cell, energy storage device) includes an electrode 512 (e.g., cathode, anode) having first and second surfaces 514, 516 on opposing sides thereof. The electrode 512 may be formed from and/or include grains (e.g., inorganic grains, ceramic grains, crystalline grains) sintered to one another, forming a sheet 518 that continuously extends between the first and second surfaces 514, 516 (e.g., major surfaces) of the electrode 512. According to an exemplary embodiment, the grains are of materials (e.g., electrode materials) disclosed herein, and may include lithium, such that the electrode is more particularly a lithium electrode. As disclosed herein, in some embodiments, the sheet 518 may include, be mostly formed from (by volume), be at least 90% formed from, etc., lithium cobaltite (LCO), for example, or other materials disclosed herein.

According to an exemplary embodiment, the sheet 518 is self-supporting and/or is porous and includes passages 520 extending into the sheet 518 from the first and/or second surfaces 514, 516. For example, as shown in FIG. 15, the sheet 518 may have passages 520 only extending in from the first surface 514 and terminating within the sheet 518. In other embodiments, the passages may extend from both surfaces and fully through the respective sheet (see generally FIG. 17). Porosity of the sheet 518 may be as disclosed herein, and/or the sheet 518 may have a porosity of at least 1% by volume, at least 3%, at least 5%, at least 10%, at least 15%, at least 30%, for example, and/or at most 90%, at most 70%, at most 50%, or other amounts. The porosity may be open porosity such that pores open to the surfaces 514, 516 and/or to one another and are connected to one another within the sheet 518 (see generally pores in FIGS. 13A and 13B), forming the passages 520. In some embodiments, the passages 520 wind, meander, branch, interconnect, etc. through the sheet 518, and/or the passages 520 may not provide a straight line of sight between the first and second surfaces 514, 516 of the sheet 518.

According to an exemplary embodiment, solid electrolyte 522 is, is mostly, is at least 90%, and/or includes a lithium solid electrolyte, such as lithium phosphosulfide (LPS; e.g., 75Li$_2$S·25P$_2$S$_5$, Li$_7$P$_3$S$_{11}$), Li$_2$S—SiS$_2$—Li$_4$SiO$_4$, Li—Si—S electrolytes, or other solid electrolytes disclosed herein. For clarity, LPS is a solid electrolyte including, but not limited to, lithium, phosphor, and sulfur, and may include other components, such as germanium or silica for example. Also, other embodiments may include lithium electrolytes, such as lithium solid electrolytes, that do not contain sulfur and may be melt processable, as disclosed herein. The solid electrolyte 522 overlays (i.e. extends at least partially over; e.g., fully covers, mostly covers, coats, directly contacts) the first surface 514 of the sheet 518, such as is shown in FIG. 15. Further, the solid electrolyte 522 may extend into passages 520 of the sheet 518. Positioning of the solid electrolyte 522 within the passages 520 may enhance connectivity and efficiency between the solid electrolyte 522 and the electrode 512, such as by increasing area of their interface and providing a shorter distance between the electrode 512 and electrolyte 522, especially for material within the electrode 512.

Referring to FIG. 15, the device 510 includes the electrode 512 and the solid electrolyte 522, as disclosed, but in some embodiments is anode-less. In such embodiments, the electrode 512 is a cathode and a current collector 524 overlays, directly contacts, and electrically connects to the solid electrolyte. The solid electrolyte may form or function as an anode, without requiring use or additional inclusion of separate anode material. Such a design may allow for a particularly thin and/or flexible device 510. A second current collector 526 may be connected to the electrode 512. Insulative or protective barriers 528, such as of polymer or other materials may cover surfaces of the device 510.

As indicated herein, the electrode 512, including the sheet of sintered material 518, may be particularly thin, such having a thickness $T_1$ of less than 500 µm, less than 300 µm, less than 100 µm, and/or greater than 10 µm. Such thinness facilitates a very compact energy device 510, and/or allows for an efficient capacity per volume. In other contemplated embodiments, the electrode 512 may be thicker than 500 µm or thinner 10 µm.

Further, using technology herein, a melt-processable solid electrolyte, such as a lithium solid electrolyte 522, such as LPS, may be sintered or fused directly onto the sheet 518, without binder in the melt-processable solid electrolyte 522.

This further enhances the compactness of the device 510. According to an exemplary embodiment, the solid electrolyte 522 extends outward from the first major surface 514 by a distance $T_2$ of less than 300 µm, less than 200 µm, less than 100 µm, and/or at least 1 µm, such as at least 10 µm. In other contemplated embodiments, the distance $T_2$ may be thicker than 300 µm or thinner 1 µm, or even essentially zero in some contemplated embodiments.

According to an exemplary embodiment, at least some of the passages 520 have a length of at least 5 µm, such as at least 10 µm, such as at least 20 µm. This length may be along a tortuous path that may branch and wind, connecting though various open pores within the sheet 518. In some such embodiments, the solid electrolyte 522 (e.g., lithium solid electrolyte, LPS, $Li_2S$—$SiS_2$—$Li_4SiO_4$) extends into at least some of the passages 520, such as to a distance of at least 2 µm inward from the first major surface, such as at least 3 µm, such as at least 5 µm, such as at least 10 µm, which may enhance ionic efficiency of the device by increasing relative interfacial surface area between the electrode 512 and electrolyte 522 and/or by reducing a distance therebetween. The electrolyte 522 may not extend or fully fill all of the passages 520, and/or may extend into the sheet 518 to a limited depth, such as not more than half the thickness $T_1$, such as not more than a quarter of the thickness $T_1$, such as not more than an eighth of the thickness $T_1$, and/or at least a thirty-second of the thickness $T_1$, such as at least a sixteenth of the thickness $T_1$, and/or not more than 20 µm, such as not more than 10 µm, and/or at least 1 µm, such as at least 3 µm, such as at least 5 µm in at least some locations of such embodiments, or not at all, such as for sheets of electrode material having little or no porosity or passages.

Figure 16A:
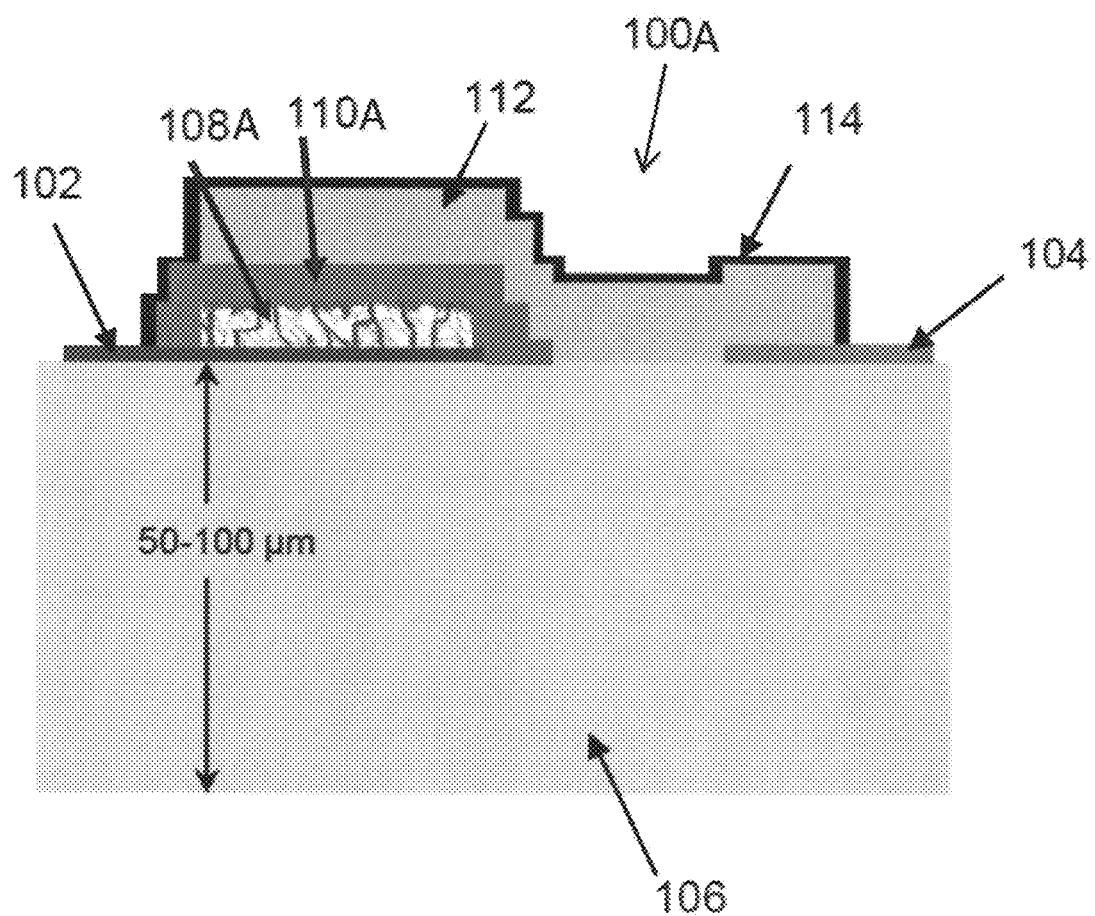
FIG. 16A is a conceptual diagram of an energy device according to another exemplary embodiment.

Referring now to FIG. 16A, a device 100A includes an electrode 108A with solid electrolyte 110A overlaying and infused within passages of the electrode 108A. The electrode 108A and electrolyte 110A are integrated into a thin-film micro-battery, similar to the device of FIG. 2 for example, or may be integrated into other devices. In some such embodiments, the device 100A may more specifically include LPS as the solid electrolyte 110A and a sheet of LCO as the electrode 108A, in this instance cathode material. The sheet of LCO may have attributes disclosed herein, such as long length (e.g., >1 meter, >3 meters) and/or being particularly thin (e.g., less than 300 µm, less than 100 µm) with unpolished, granular surface profile.

Figure 16B:
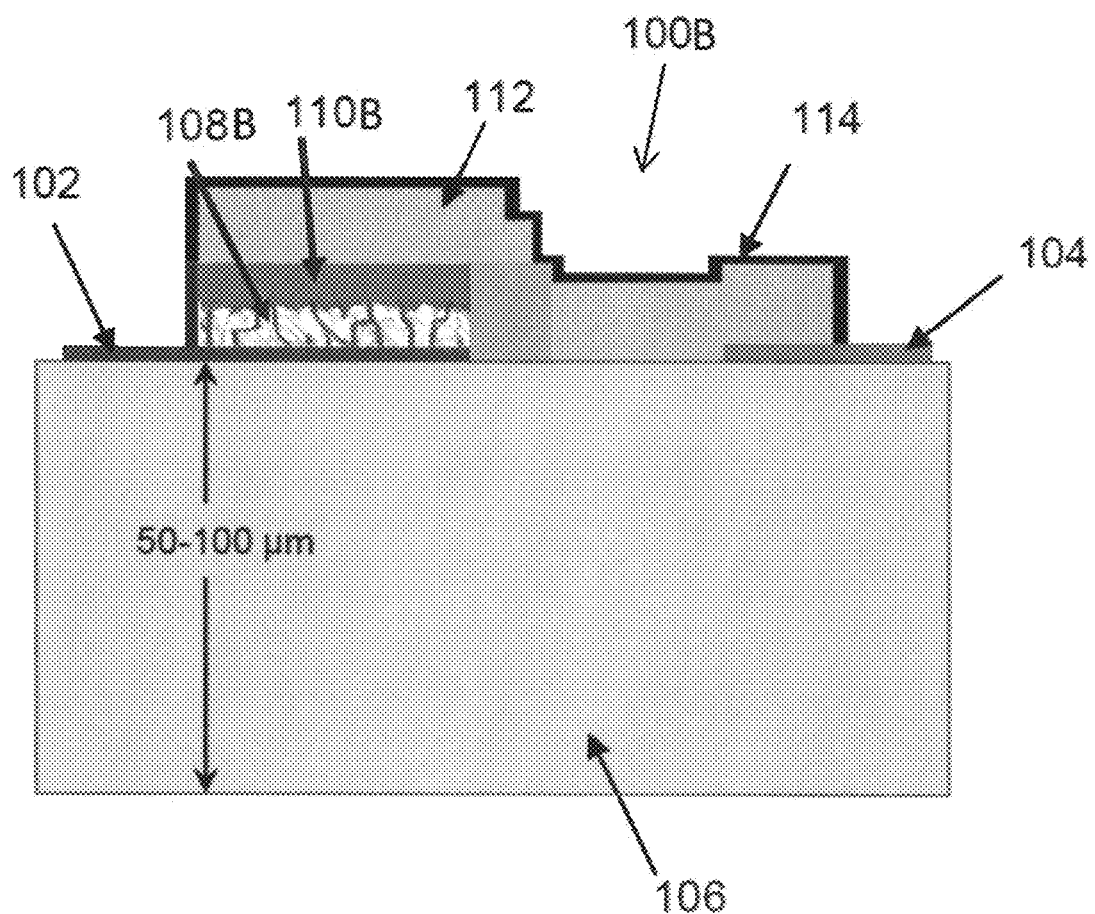
FIG. 16B is a conceptual diagram of an energy device according to still another exemplary embodiment.

FIG. 16B shows an embodiment of a device 100B with many attributes similar to FIG. 16A, where technology of the present application is used in a thin-film micro-battery. However, the device 100B is constructed using a sintered, self-supporting cathode 108B, such as a sheet of LCO or LMO, as a mechanical support for deposition of a melt processable solid electrolyte 110B, such as LPS. For example, a long ribbon or strip of sintered cathode material is coated with the solid electrolyte and processed in a roll-to-roll manner, and then cut (e.g., singulated) into smaller pieces for integration into thin-film micro-battery(ies) 100B. With this manufacturing approach, the sintered, self-supporting sheet 108B of electrode material (e.g., LCO) mechanically supports the solid electrolyte 110B (e.g., LPS) and correspondingly geometrically constrains the solid electrolyte 110B such that, in terms of area, a footprint of the solid electrolyte 110B facing the sheet 108B of the electrode is not greater than 120% of a footprint of the first major surface of the sheet 108B, such as not greater than 110%, 105% of the first major surface of the sheet 108B, where 'footprint facing the sheet' refers to the non-overlapping 108B (i.e. not double-counting) surface area oriented parallel to length- and width-directions of the sheet (i.e., corresponding to a major surface); or put another way, 'footprint facing the sheet' refers to the area of the flat shape demarcating the corresponding interfacing surface, as opposed to all interfacing surface area on a microscale, which may be far greater than the footprint due to surfaces of the porous passages and complexity of the electrode-to-electrolyte interface. With that said, some of the solid electrolyte 110B may extend over edges of the sheet 108B, such as where the footprint of the solid electrolyte 110B may be greater than the underlying footprint of the sintered sheet 108B but still mechanically supported thereby.

Figure 17:
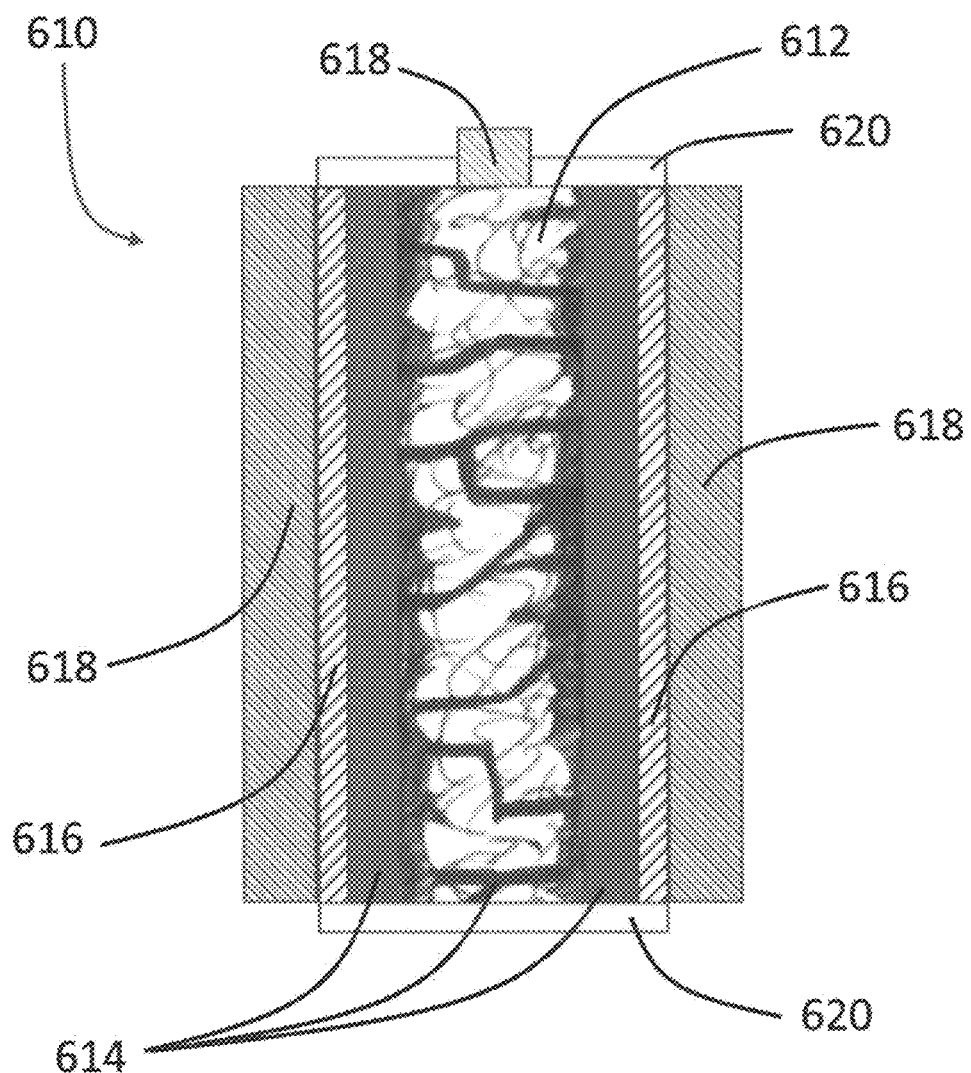
FIG. 17 is a conceptual diagram of an energy device according to yet another exemplary embodiment.

Referring to FIG. 17, use of a self-supporting, sintered sheet for an electrode 612 may allow melt processable lithium solid electrolyte 614 to be joined to major surfaces of the sheet because the sheet may provide mechanical support for the solid electrolyte and such a device 610 may not require an additional mechanical support (e.g., support 106 of FIGS. 2 and 16) underlying the electrode 612. Using technology disclosed herein, the solid electrolyte 614 may pass through porous passages in the sheet of the electrode 612, to join (e.g., interconnect, connect) solid electrolyte 614 on both major surfaces of the electrode 612. This is an advantage of the present technology, which may not require one side of the electrode to be bonded to a mechanical support blocking access to the electrolyte, for example. In other embodiments, the electrolyte 614 may not extend fully through the sheet of the electrode 612 (see generally FIG. 15).

Encapsulating the electrode 612 (e.g., sintered LMO, LCO, etc.) with melt processable solid electrolyte 614 (e.g., lithium solid electrolyte, LPS) may provide excellent interfacial properties and corresponding ion performance of the device 610, such as compared to devices with only a single side of the electrode 612 overlaid by electrolyte 614. According to an exemplary embodiment, the electrode 612 of FIG. 17 is a cathode and the energy device 610 of FIG. 17 further includes anodes 616, comprising anode material as disclosed herein, and current collectors 618 electrically coupled to the electrode 612, anode 616, and/or electrolyte 614. The energy device 610 may further include cover material 620, such as a housing and/or insulation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An energy device, comprising:
   an electrode comprising a ceramic sheet, wherein the ceramic comprises lithium, wherein the sheet is porous, wherein porosity of the sheet is such that pores open to surfaces of the sheet and pores open to one another and are connected to one another within the sheet forming passages that wind and branch through the sheet; and a solid electrolyte comprising lithium overlaying a first major surface of the porous sheet of the electrode and extending into the passages of the sheet, the solid electrolyte is also overlaying a second major surface of the sheet of the electrode, and wherein the solid electrolyte extends through the passages and connects together the solid electrolyte overlaying the first and second surfaces.

2. The energy device of claim 1, wherein the ceramic of the sheet of the electrode comprises lithium cobaltite (LCO).

3. The energy device of claim 2, wherein the solid electrolyte overlaying the first major surface of the sheet of the electrode has a density of at least 90%.

4. The energy device of claim 2, further comprising a current collector, wherein the current collector overlays, directly contacts, and electrically connects to the solid electrolyte.

5. The energy device of claim 2, wherein the sheet of the electrode mechanically supports the solid electrolyte and correspondingly geometrically constrains the solid electrolyte such that, in terms of area, a footprint of the solid electrolyte facing the sheet of the electrode is not greater than 120% of a footprint of the first major surface of the sheet of the electrode.

6. The energy device of claim 2, wherein at least some of the passages have a length of at least 10 μm, and wherein the solid electrolyte extends into at least some of the passages a distance of at least 3 μm inward from the first major surface.

7. The energy device of claim 6, wherein the sheet of the electrode has a thickness greater than 10 μm and less than 100 μm, and the solid electrolyte extends outward from the first major surface by less than 100 μm, thereby facilitating a particularly thin device.

8. An energy device, comprising:
an electrode comprising lithium cobaltite (LCO) forming a porous sheet with passages, wherein the passages wind and branch through the sheet; and
a solid electrolyte comprising lithium encapsulating the electrode such that the solid electrolyte overlays both a first major surface and a second major surface of the sheet of LCO and extends into the passages,
wherein at least some of the passages have a length of at least 10 μm, and wherein the solid electrolyte extends into at least some of the passages a distance of at least 3 μm inward from the first and second major surfaces.

9. The energy device of claim 8, wherein the solid electrolyte overlaying the first and second major of the sheet surfaces has a density of at least 90%, and wherein at least 90% by volume of the solid electrolyte consists of inorganic crystalline or amorphous glassy solid electrolyte, as opposed to organic binder.

10. The energy device of claim 8, further comprising a current collector, wherein the current collector overlays, directly contacts, and electrically connects to the solid electrolyte.

11. The energy device of claim 8, wherein the sheet of LCO mechanically supports the solid electrolyte and correspondingly geometrically constrains the solid electrolyte such that, in terms of area, a footprint of the solid electrolyte facing the first major surface of the sheet of LCO is not greater than 120% of a footprint of the first major surface.

12. The energy device of claim 8, wherein the solid electrolyte extends through the passages and connects together the solid electrolyte overlaying the first and second surfaces, thereby facilitating efficiency through enhanced interfacing of the electrode to solid electrolyte.

13. The energy device of claim 8, wherein the sheet of LCO has a thickness greater than 10 μm and less than 100 μm, and the solid electrolyte extends outward from each of the first and second major surfaces by less than 100 μm.

14. An energy device, comprising:
a cathode comprising lithium cobaltite (LCO) forming a porous sheet with passages, wherein the passages wind and branch through the sheet; and
a solid electrolyte comprising lithium overlaying both a first major surface and a second major surface of the sheet of LCO and extending into the passages,
a current collector, wherein the device is anode-less such that the current collector overlays, directly contacts, and electrically connects to the solid electrolyte.

15. The energy device of claim 14, wherein the sheet of LCO mechanically supports the solid electrolyte and correspondingly geometrically constrains the solid electrolyte such that, in terms of area, a footprint of the solid electrolyte facing the sheet of LCO is not greater than 120% of a footprint of the first major surface of the sheet of LCO.

16. The energy device of claim 14, wherein at least some of the passages have a length of at least 10 μm, and wherein the solid electrolyte extends into at least some of the passages a distance of at least 3 μm inward from the first major surface.

17. The energy device of claim 14, wherein the sheet of LCO has a thickness greater than 10 μm and less than 100 μm, and the solid electrolyte extends outward from the first major surface by less than 100 μm.

18. An energy device, comprising:
an electrode comprising lithium cobaltite (LCO) forming a self-supporting, porous sheet with passages, wherein the passages wind and branch through the sheet; and
a solid electrolyte comprising lithium overlaying both a first major surface and a second major surface of the sheet of LCO and extending into the passages,
wherein the energy device is substrate-free such that the sheet of LCO mechanically supports the solid electrolyte, and correspondingly geometrically constrains the solid electrolyte such that an area of a footprint of the solid electrolyte facing the sheet of LCO is not greater than 120% of area of a footprint of the first major surface of the sheet of LCO.

19. The energy device of claim 18, further comprising a current collector overlaying, directly contacting, and electrically connected to the solid electrolyte.

20. The energy device of claim 18, wherein the solid electrolyte is binder-free.

21. The energy device of claim 18, wherein the solid electrolyte overlaying the first major surface of the sheet has a density of at least 90%, and wherein the solid electrolyte mostly consists of inorganic crystalline or amorphous glassy solid electrolyte, as opposed to organic binder, by volume.

22. The energy device of claim 18, wherein at least some of the passages have a length of at least 10 μm, and wherein the solid electrolyte extends into at least some of the passages a distance of at least 3 μm inward from the first major surface.

23. The energy device of claim 18, wherein the sheet of LCO has a thickness greater than 10 μm and less than 100 μm, and the solid electrolyte extends outward from the first major surface by less than 100 μm.

24. The energy device of claim 1, wherein porosity of the sheet of the electrode is at least 15% by volume.

25. The energy device of claim 1, wherein the solid electrolyte is an amorphous glassy solid electrolyte having a melting temperature above 200° C.

\* \* \* \* \*

UNITED STATES PATENT AND TRADEMARK OFFICE
CERTIFICATE OF CORRECTION

PATENT NO. : 11,271,201 B2
APPLICATION NO. : 16/521020
DATED : March 8, 2022
INVENTOR(S) : Michael Edward Badding et al.

Page 1 of 1

It is certified that error appears in the above-identified patent and that said Letters Patent is hereby corrected as shown below:

On the Title Page

On the page 2, in Column 1, Item (56) under "Other Publications", Line 2, delete "Jounral" and insert -- Journal --.

On the page 2, in Column 2, Item (56) under "Other Publications", Line 26, delete "Upon" and insert -- LiPON --.

On the page 2, in Column 2, Item (56) under "Other Publications", Line 39, delete "Enery" and insert -- Energy --.

In the Specification

In Column 1, Line 7, delete "2019" and insert -- 2019, --.

Signed and Sealed this
Fourteenth Day of June, 2022

Katherine Kelly Vidal
*Director of the United States Patent and Trademark Office*